United States Patent
Kawano et al.

(10) Patent No.: US 9,471,841 B2
(45) Date of Patent: Oct. 18, 2016

(54) ELECTRONIC DOCUMENT GENERATION SYSTEM, IMAGE FORMING APPARATUS AND PROGRAM

(71) Applicant: Konica Minolta, Inc., Chiyoda-ku, Tokyo (JP)

(72) Inventors: Takuya Kawano, Toyokawa (JP); Masaaki Saka, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 35 days.

(21) Appl. No.: 14/685,843

(22) Filed: Apr. 14, 2015

(65) Prior Publication Data

US 2015/0317531 A1 Nov. 5, 2015

(30) Foreign Application Priority Data

May 1, 2014 (JP) .................................. 2014-094431

(51) Int. Cl.

| | |
|---|---|
| *G06K 9/34* | (2006.01) |
| *G06K 9/32* | (2006.01) |
| *H04N 1/387* | (2006.01) |
| *H04N 1/409* | (2006.01) |
| *G06K 9/40* | (2006.01) |
| *H04N 1/00* | (2006.01) |
| *G06K 9/36* | (2006.01) |
| *G06K 9/00* | (2006.01) |

(52) U.S. Cl.
CPC ............... *G06K 9/32* (2013.01); *G06K 9/3283* (2013.01); *G06K 9/34* (2013.01); *G06K 9/346* (2013.01); *G06K 9/36* (2013.01); *G06K 9/40* (2013.01); *H04N 1/00127* (2013.01); *H04N 1/387* (2013.01); *H04N 1/3878* (2013.01); *H04N 1/409* (2013.01); *G06K 9/00463* (2013.01); *G06K 9/3233* (2013.01); *G06K 2009/363* (2013.01); *G06K 2009/366* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,867,277 A * | 2/1999 | Melen | G06F 17/30017 358/296 |
| 2008/0225340 A1* | 9/2008 | Ohguro | G06K 9/00463 358/2.1 |

FOREIGN PATENT DOCUMENTS

JP          2005-011260 A     1/2005

* cited by examiner

*Primary Examiner* — Feng Niu
(74) *Attorney, Agent, or Firm* — Buchanan Ingersoll & Rooney PC

(57) ABSTRACT

An electronic document generation system includes: an image forming apparatus configured to generate a scanned image of an original document; and an external terminal configured to receive image data of the scanned image from the image forming apparatus, and generate an electronic document based on the scanned image, wherein the image forming apparatus includes: a divided data generation unit; a determination unit; and a communication unit, of the plurality of divided image data, the communication unit transmits, to the external terminal, divided image data that is determined to be the processing target data at an earlier point in time, and transmits, to the external terminal, divided image data that is determined not to be the processing target data after the divided image data that is determined to be the processing target data are transmitted, and the external terminal includes: an obtaining unit; and a document generation unit.

20 Claims, 15 Drawing Sheets

FIG. 4
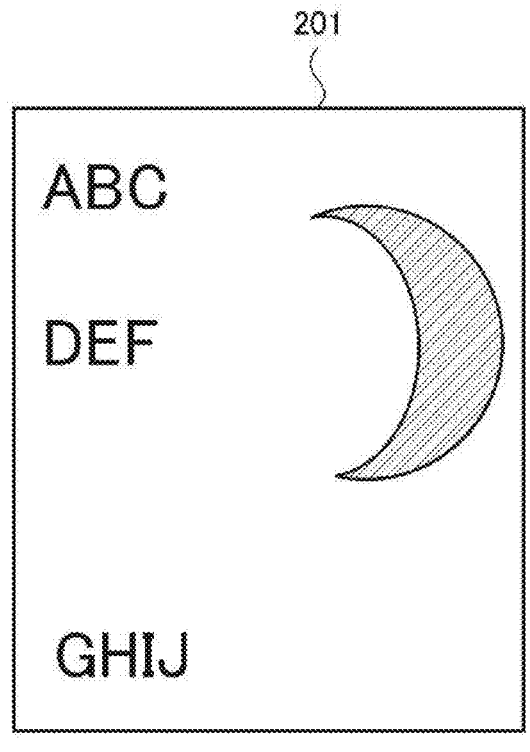
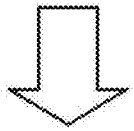
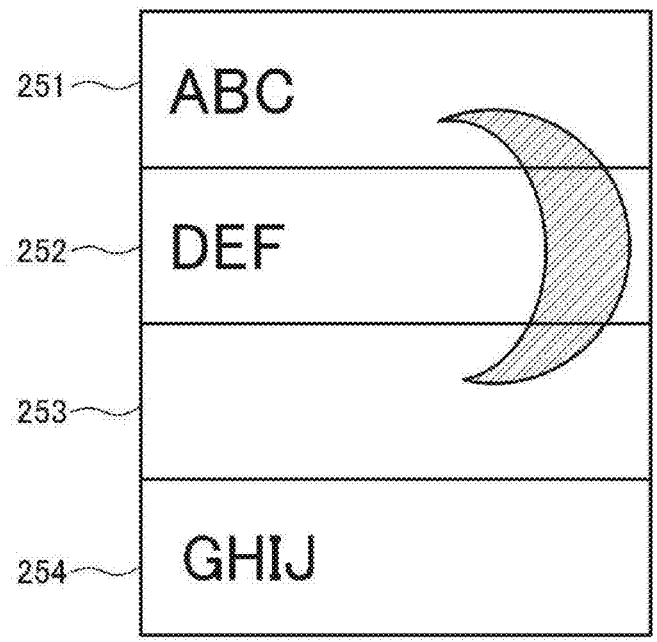

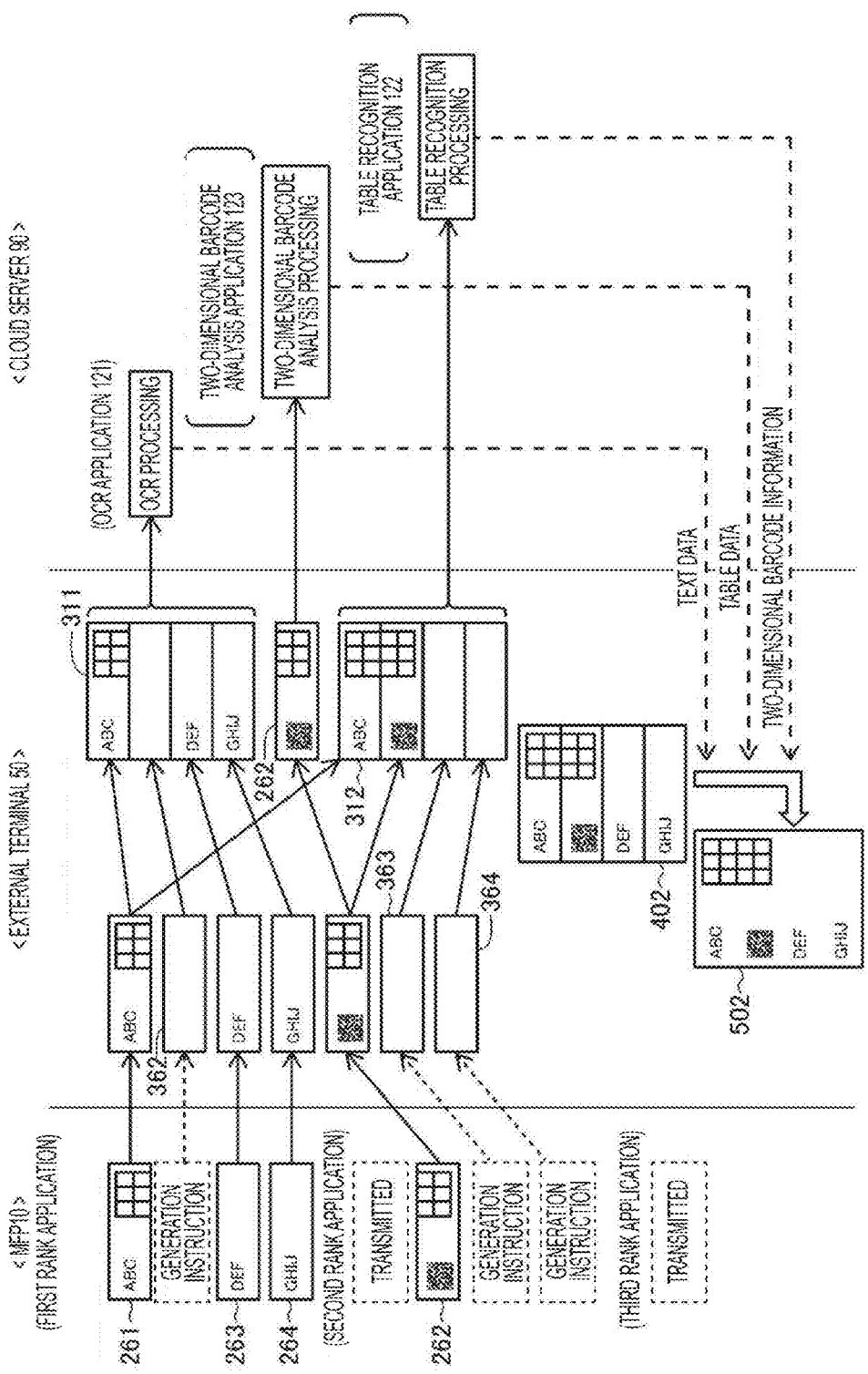

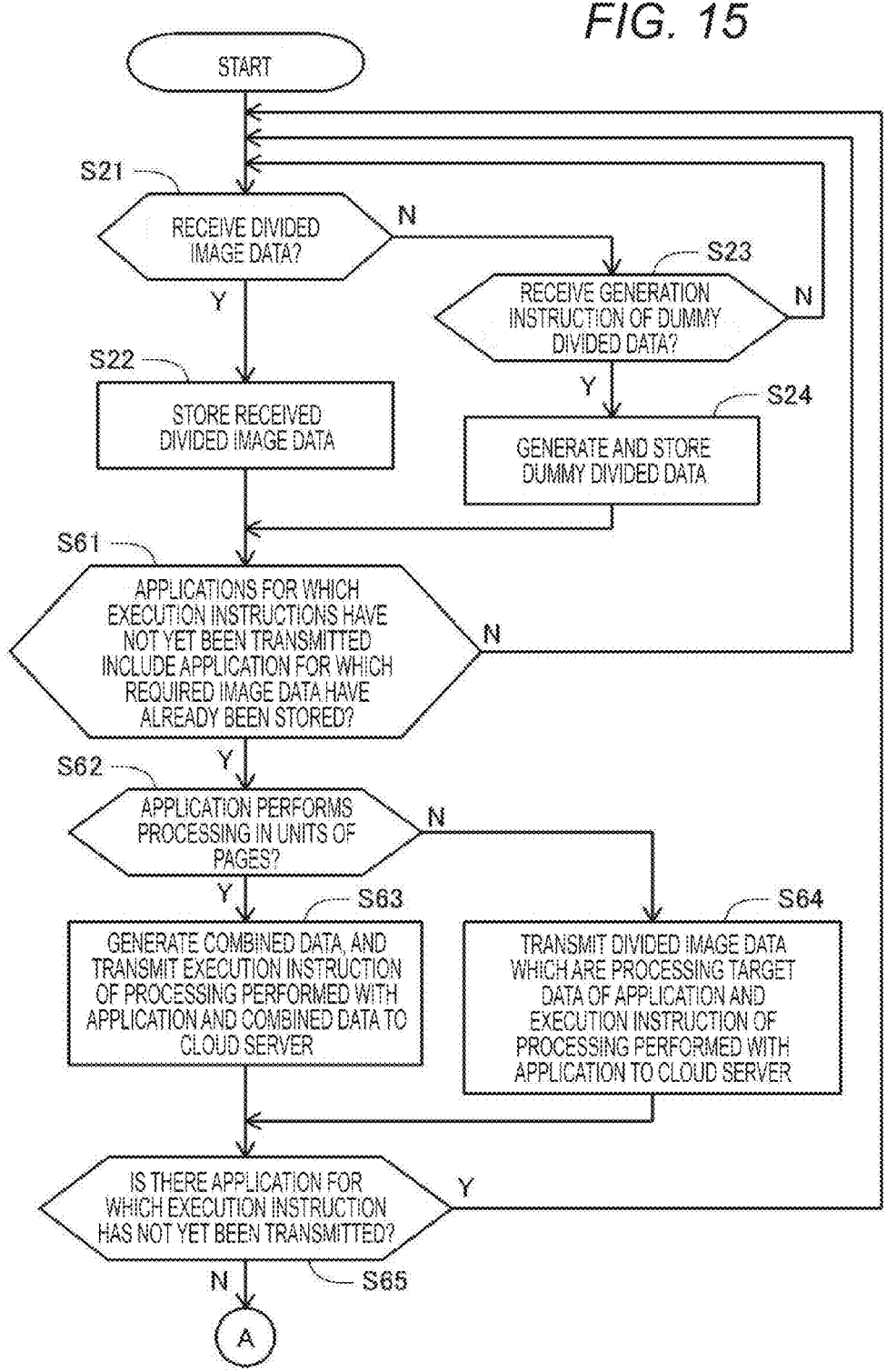

ELECTRONIC DOCUMENT GENERATION SYSTEM, IMAGE FORMING APPARATUS AND PROGRAM

The entire disclosure of Japanese Patent Application No. 2014-094431 filed on May 1, 2014 including description, claims, drawings, and abstract are incorporated herein by reference in its entirety.

BACKGROUND OF THE INVENTION

1. Field of the Invention

The present invention relates to an electronic document generation system generating an electronic document, and a technique related thereto.

2. Description of the Related Art

There is a technique for transmitting a scanned image generated by an image forming apparatus such as an MFP (Multi-Functional Peripheral) to an apparatus different from the image forming apparatus (for example, a cloud server) and causes the different apparatus to execute various kinds of processing based on the scanned image (for example, Optical Character Recognition processing (which will be hereinafter also referred to as OCR (Optical Character Recognition) processing)).

For example, in JP 2005-11260 A, a multi-function machine executes document scanning, and the scanned image is transmitted from the multi-function machine to a document management server. The document management server executes OCR processing on the scanned image, and transmits the scanned image and the OCR processing result (text data) to a work terminal. Then, the scanned image and the OCR processing result are displayed on the work terminal.

By the way, the scanned image made by the image forming apparatus may be transmitted to an external terminal different from the image forming apparatus, and the external terminal may generate an electronic document based on the scanned image. When an electronic document is generated by the external terminal, the external terminal may cause a cloud server to execute related processing related to generation processing of the electronic document such as OCR processing of the scanned image.

For example, when the external terminal finishes the reception of the scanned image from the image forming apparatus, the external terminal transmits (transfers) the scanned image to a cloud server to have the cloud server execute the OCR processing (related processing), and generate an electronic document (text data-attached electronic document and the like) on the basis of the scanned image and the OCR processing result executed by the cloud server. When such operation can be performed, the processing load can be distributed to multiple apparatuses.

However, in the above operation, for example, even when the scanned image includes an area in which there is no need to perform the OCR processing (not including any character), the external terminal cannot transmit the scanned image to the cloud server until the external terminal finishes the reception of all the data of the scanned image transmitted from the image forming apparatus. Therefore, when it takes a relatively long time for the external terminal to receive all of the data, there is relatively a long waiting time until the cloud server starts execution of the OCR processing, and the external terminal cannot efficiently generate the electronic document.

Such problem may occur not only when the cloud server executes related processing (OCR processing and the like) but also when the external terminal executes similar processing.

SUMMARY OF THE INVENTION

Therefore, it is an object of the invention to provide a technique capable of causing an external terminal to efficiently generate an electronic document.

To achieve at least the abovementioned object, according to an aspect, an electronic document generation system reflecting one aspect of the present invention comprises: an image forming apparatus configured to generate a scanned image of an original document; and an external terminal configured to receive image data of the scanned image from the image forming apparatus, and generate an electronic document based on the scanned image, wherein the image forming apparatus includes: a divided data generation unit configured to divide the scanned image into a plurality of areas and generate a plurality of divided image data; a determination unit configured to determine whether each of the plurality of divided image data is processing target data of related processing related to generation of the electronic document; and a communication unit configured to transit the plurality of divided image data to the external terminal, of the plurality of divided image data, the communication unit transmits, to the external terminal, divided image data that is determined to be the processing target data at an earlier point in time, and transmits, to the external terminal, divided image data that is determined not to be the processing target data after the divided image data that is determined to be the processing target data are transmitted, and the external terminal includes: an obtaining unit configured to obtain a processing result of the related processing of preferential data which are divided image data of the plurality of divided image data determined to be the processing target data and transmitted at an earlier point in time from the image forming apparatus; and a document generation unit configured to generate the electronic document on the basis of the processing result and the plurality of divided image data.

In the electronic document generation system of Item. 2 according to Item. 1, the external terminal preferably further includes: a transmission unit configured to transmit, to a cloud server, the preferential data which are divided image data of the plurality of divided image data that are transmitted from the image forming apparatus at an earlier point in time, before reception of the plurality of divided image data is completed; and a reception unit configured to receive, from the cloud server, a processing result of the related processing of the preferential data executed by the cloud server.

In the electronic document generation system of Item. 3 according to Item. 2, the communication unit of the image forming apparatus also preferably transmits, to the external terminal, a generation instruction indicating generation of dummy divided data which are dummy image data corresponding to non-preferential data, before the non-preferential data which are divided image data of the plurality of divided image data determined not to be the processing target data are transmitted, when the generation instruction is received, the document generation unit of the external terminal preferably generates the dummy divided data, and combines the dummy divided data and the preferential data to generate combined data, an image based on the dummy divided data is preferably disposed at a position of an image based on the combined data corresponding to a display position of the non-preferential data of the scanned image, and the transmission unit of the external terminal preferably transmits the combined data to the cloud server before the reception of the plurality of divided image data is completed.

In the electronic document generation system of Item. 4 according to Item. 2, the document generation unit of the external terminal preferably generates combined data by combining the plurality of preferential data of the plurality of divided image data transmitted from the image forming apparatus at an earlier point in time, the transmission unit of the external terminal preferably transmits the combined data to the cloud server before the reception of the plurality of divided image data is completed.

In the electronic document generation system of Item. 5 according to Item. 1, the determination unit of the image forming apparatus preferably determines that divided image data having a particular attribute corresponding to the related processing are the processing target data.

In the electronic document generation system of Item. 6 according to Item. 1, when optical character recognition processing is executed as the related processing, the determination unit of the image forming apparatus preferably determines that divided image data including a character are the processing target data, and the document generation unit of the external terminal preferably generates the electronic document on the basis of the plurality of divided image data and text data which is a processing result of the optical character recognition processing.

In the electronic document generation system of Item. 7 according to Item. 1, the document generation unit of the external terminal preferably executes, in parallel with the related processing, generation processing of integrated image data which are image data obtained by integrating the plurality of divided image data and are image data corresponding to the scanned image, and the electronic document is preferably generated on the basis of the integrated image data and a processing result of the related processing.

In the electronic document generation system of Item. 8 according to Item. 1, the determination unit of the image forming apparatus preferably sets a preferential order of the plurality of pieces of related processing into a descending order of a required processing time of each of the plurality of pieces of related processing, and determines whether each of the plurality of divided image data is processing target data of the related processing in question of the plurality of pieces of related processing which is set in order in accordance with preferential order, and the communication unit of the image forming apparatus preferably transmits, to the external terminal, divided image data determined to be processing target data of the related processing in question at a point in time earlier than a point in time when divided image data determined not to be processing target data of the related processing in question are transmitted.

In the electronic document generation system of Item. 9 according to Item. 2, the determination unit of the image forming apparatus preferably sets a preferential order of the plurality of pieces of related processing into a descending order of a required processing time of each of the plurality of pieces of related processing, and determines whether each of the plurality of divided image data is processing target data of the related processing in question of the plurality of pieces of related processing which is set in order in accordance with preferential order, the communication unit of the image forming apparatus preferably transmits, to the external terminal, divided image data determined to be processing target data of the related processing in question at a point in time earlier than a point in time when divided image data determined not to be processing target data of the related processing in question are transmitted, and the transmission unit of the external terminal preferably transmits, to the cloud server, divided image data determined to be processing target data of each piece of related processing in question of the plurality of pieces of related processing which is set in the same order as the preferential order that is set by the image forming apparatus, and causes the cloud server to execute each piece of related processing in question.

In the electronic document generation system of Item. 10 according to Item. 2, the determination unit of the image forming apparatus preferably sets a preferential order of the plurality of pieces of related processing into a descending order of a required processing time of each of the plurality of pieces of related processing, and determines whether each of the plurality of divided image data is processing target data of the related processing in question of the plurality of pieces of related processing which is set in order in accordance with preferential order, the communication unit of the image forming apparatus preferably transmits, to the external terminal, divided image data determined to be processing target data of the related processing in question at a point in time earlier than a point in time when divided image data determined not to be processing target data of the related processing in question are transmitted, and when it is determined that the plurality of pieces of related processing includes particular related processing which has completed reception of image data required to start execution of the processing from the image forming apparatus, the transmission unit of the external terminal preferably transmits, to the cloud server, divided image data determined to be processing target data of the particular related processing regardless of the preferential order of the plurality of pieces of related processing, and causes the cloud server to execute the particular related processing.

To achieve at least the abovementioned object, according to an aspect, an image forming apparatus capable of communicating with an external terminal generating an electronic document, reflecting one aspect of the present invention comprises: a divided data generation unit configured to generate a plurality of divided image data by dividing a scanned image of an original document into a plurality of areas; a determination unit configured to determine whether each of the plurality of divided image data is processing target data of related processing executed in relation with generation of the electronic document; and a communication unit configured to transmit the plurality of divided image data to the external terminal, wherein the communication unit transmits, to the external terminal, divided image data of the plurality of divided image data determined to be the processing target data at an earlier point in time, and transmits, to the external terminal, divided image data of the plurality of divided image data determined not to be the processing target data at a point in time after the divided image data determined to be the processing target data are transmitted.

In the image forming apparatus of Item. 12 according to Item. 11, the related processing is preferably processing executed by the external terminal.

In the image forming apparatus of Item. 13 according to Item. 11, the related processing is preferably processing that is executed by a cloud server capable of communicating with the external terminal.

To achieve at least the abovementioned object, according to an aspect, a non-transitory recording medium storing a computer readable program reflecting one aspect of the present invention causes a computer which controls an image forming apparatus capable of communicating with an external terminal generating an electronic document to execute: a) a step of generating a plurality of divided image data by dividing a scanned image of an original document into a plurality of areas; b) a step of determining whether each of the plurality of divided image data is processing target data of related processing executed in relation with generation of the electronic document; and c) a step of transmitting the plurality of divided image data to the external terminal, wherein in the step c), divided image data of the plurality of divided image data determined to be the processing target data at an earlier point in time is transmitted to the external terminal, and divided image data of the plurality of divided image data determined not to be the processing target data at a point in time is transmitted to the external terminal after the divided image data determined to be the processing target data are transmitted.

To achieve at least the abovementioned object, according to an aspect, a non-transitory recording medium storing a computer readable program reflecting one aspect of the present invention causes a computer which controls an external terminal capable of communicating with an image forming apparatus to execute generation processing of an electronic document, the program causing the computer to execute: a) a step of receiving, from the image forming apparatus at an earlier point in time, divided image data, of the plurality of divided image data generated by dividing a scanned image of an original document into a plurality of areas, that is determined to be processing target data of related processing related to generation processing of the electronic document; b) a step of obtaining a processing result of the related processing of preferential data of the plurality of divided image data which are divided image data determined to be the processing target data and transmitted from the image forming apparatus at an earlier point in time; and c) a step of generating the electronic document on the basis of the processing result and the plurality of divided image data.

The non-transitory recording medium storing a computer readable program of Item. 16 according to Item. 15 preferably causes the computer to further execute: d) a step of, before step b), transmitting, to a cloud server, the preferential data, which are divided image data of the plurality of divided image data determined to be the processing target data and transmitted from the image forming apparatus at an earlier point in time before reception of the plurality of divided image data is completed; and e) a step of receiving a processing result of the related processing of the preferential data executed by the cloud server from the cloud server.

The non-transitory recording medium storing a computer readable program of Item. 17 according to Item. 16 preferably causes the computer to further execute: f) a step of, before step d), generating dummy divided data when receiving, from the image forming apparatus, a generation instruction for generating the dummy divided data which are dummy image data corresponding to non-preferential data which are divided image data of the plurality of divided image data determined not to be the processing target data; and g) a step of generating the dummy divided data in response to reception of the generation instruction, and generating combined data by combining the dummy divided data and the preferential data, wherein an image based on the dummy divided data is disposed at a position of an image based on the combined data corresponding to a display positon of the non-preferential data in the scanned image, in step d), the combined data are transmitted to the cloud server before reception of the plurality of divided image data is completed.

The non-transitory recording medium storing a computer readable program of Item. 18 according to Item. 16 preferably causes the computer to further execute: h) a step of, before step d), generating combined data by combining a plurality of preferential data of the plurality of divided image data transmitted from the image forming apparatus at an earlier point in time, wherein, in step d), the combined data are transmitted to the cloud server before reception of the plurality of divided image data is completed.

In the electronic document generation system of Item. 19 according to Item. 1, the external terminal preferably further includes an execution start unit configured to start execution of the related processing performed with the external terminal on the preferential data of the plurality of divided image data transmitted from the image forming apparatus at an earlier point in time before reception of the plurality of divided image data is completed.

The non-transitory recording medium storing a computer readable program of Item. 20 according to Item. 15 preferably causes the computer to further execute: i) a step of, before step b), starting execution of the related processing performed with the external terminal on the preferential data of the plurality of divided image data transmitted from the image forming apparatus at an earlier point in time before reception of the plurality of divided image data is completed.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a figure illustrating a scanned image and divided image data;

FIG. 14 is a figure illustrating an overview of operation of an electronic document generation system according to a modified example of the second embodiment; and FIG. 15 is a flowchart illustrating operation of an external terminal according to the modified example of the second embodiment.

DESCRIPTION OF THE PREFERRED EMBODIMENTS

Hereinafter, an embodiment of the present invention will be described with reference to the drawings. However, the scope of the invention is not limited to the illustrated examples.

1. First Embodiment

1-1. Overview of Configuration

Figure 1:
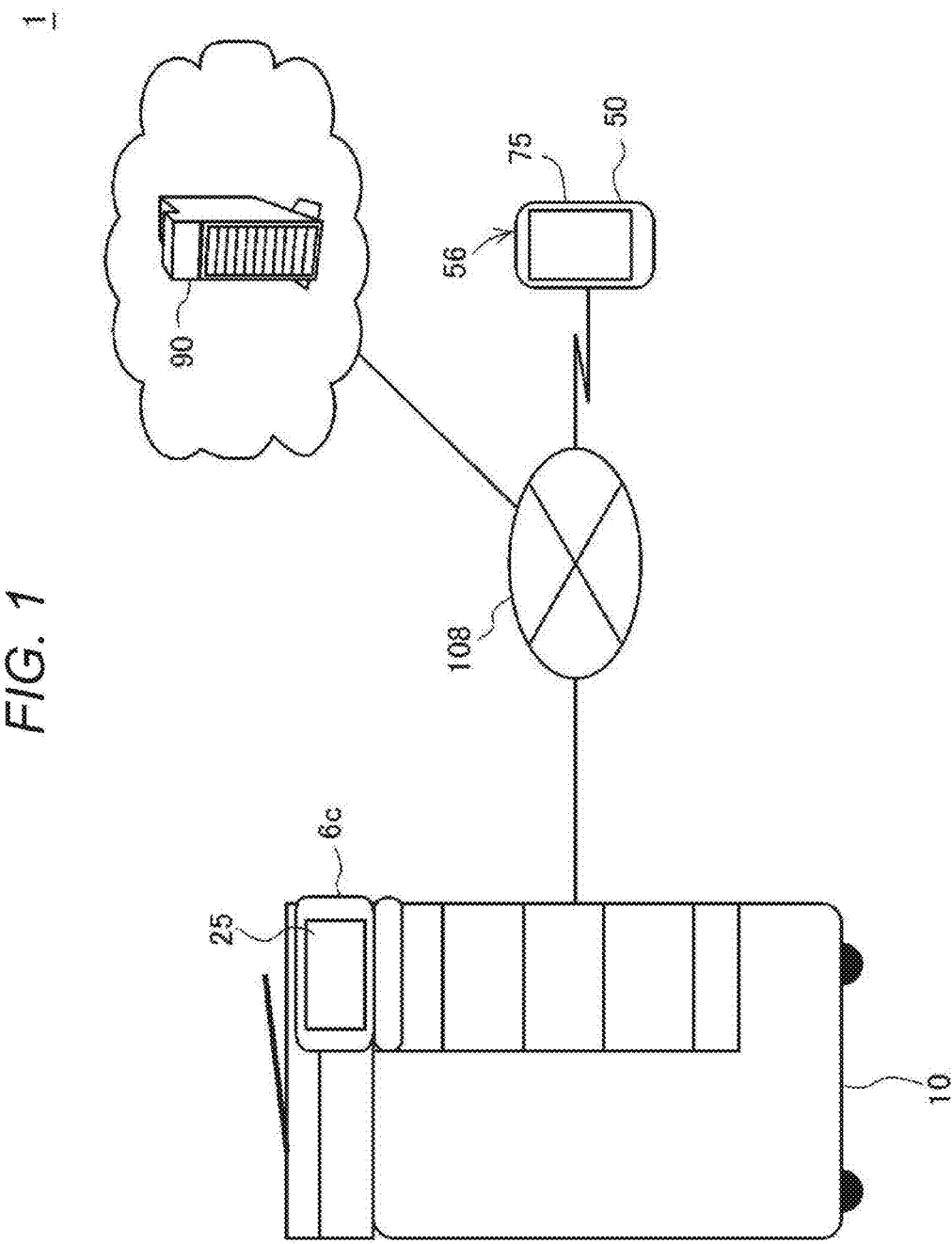
FIG. 1 is a figure illustrating an electronic document generation system (image forming system)

FIG. 1 is a figure illustrating an image forming system 1 according to the present invention. As shown in FIG. 1, the image forming system 1 includes an image forming apparatus 10, an external terminal 50, and a cloud server 90.

The image forming apparatus 10, the external terminal 50, and the cloud server 90 are connected with each other via a network (communication network) 108. The network 108 is constituted by a LAN (Local Area Network), the Internet, and the like. The form of connection to the network 108 may be a wired connection, or a wireless connection. For example, the image forming apparatus 10 and the cloud server 90 are connected via a wire to the network 108, and the external terminal 50 is wirelessly connected to the network 108.

The cloud server 90 is an external apparatus (external server) different from the image forming apparatus 10 and from the external terminal 50, and is a server for providing the external terminal 50 with services based on various kinds of applications (which may be hereinafter referred to as cloud applications). The cloud server 90 executes related processing related to generation of an electronic document performed by the external terminal 50 (generation processing). More specifically, various kinds of applications (121 and the like) are installed to the cloud server 90, and processing based on the applications (for example, OCR (Optical Character Recognition) processing and the like) are executed by the cloud server 90 as related processing.

As explained later, in this image forming system 1, a scanned image of an original document is generated by the image forming apparatus 10, and image data of the scanned image are transmitted from the image forming apparatus 10 to the external terminal 50. Then, the external terminal 50 generates an electronic document based on the scanned image by cooperating with the cloud server 90.

Since the image forming system 1 is also a system for generating an electronic document, the image forming system 1 may also referred to as an electronic document generation system and the like. Likewise, the external terminal 50 may also referred to as an electronic document generation apparatus.

1-2. Configuration of Image Forming Apparatus

Figure 2:
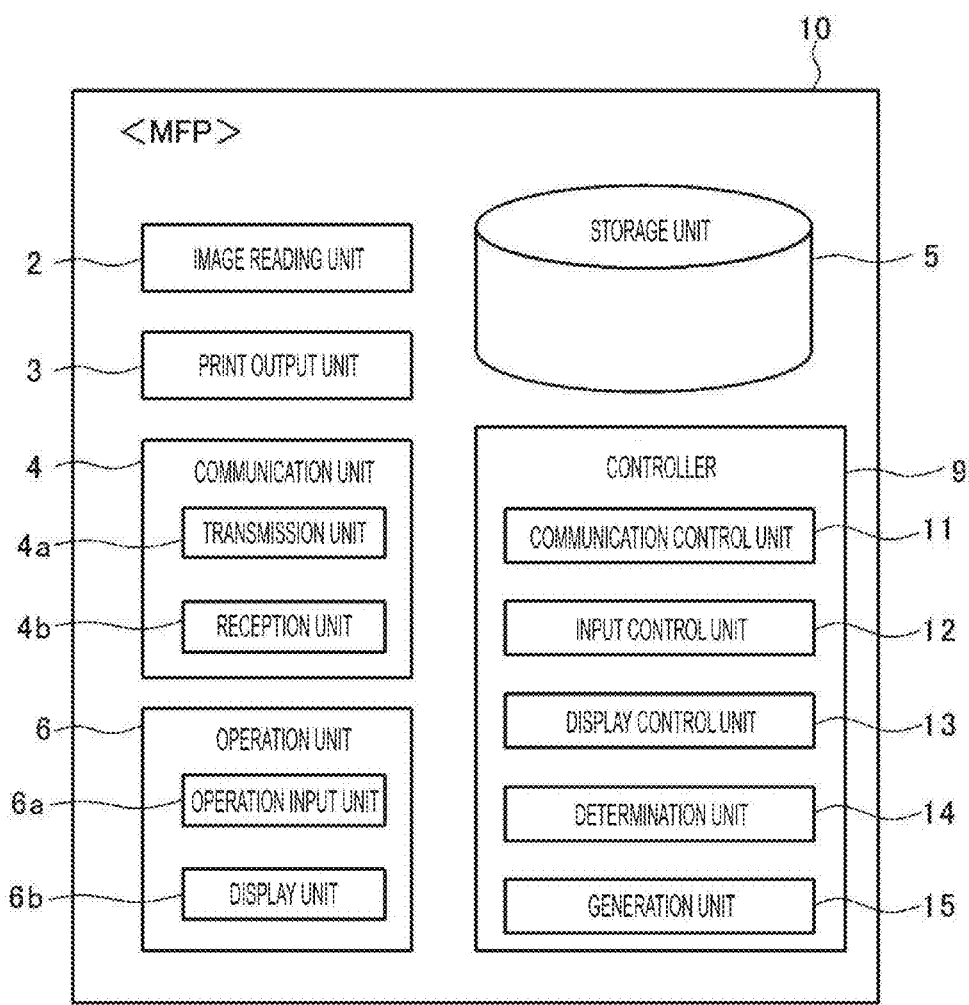
FIG. 2 is a figure illustrating function blocks of an image forming apparatus (MFP)

FIG. 2 is a figure illustrating function blocks of the image forming apparatus 10. In this case, for example, an MFP (Multi-Functional Peripheral) is shown as the image forming apparatus 10. In FIG. 2, the function blocks of the MFP 10 are shown.

The MFP 10 is an apparatus including a scan function, a copy function, a facsimile function, a box storage function, and the like (which may also be referred to as a multi-function machine). More specifically, as shown in the function block diagram in FIG. 2, the MFP 10 includes an image reading unit 2, a print output unit 3, a communication unit 4, a storage unit 5, an operation unit 6, a controller 9, and the like, and achieves various kinds of functions by operating these units in a complex manner.

The image reading unit 2 is a processing unit optically reading (i.e., scanning) an original document placed at a predetermined position of the MFP 10 and generating image data of the original document (which may also be referred to as an original document image or a scanned image). This image reading unit 2 is also referred to as a scan unit.

The print output unit 3 is an output unit for printing and outputting an image to various kinds of media such as paper on the basis of data related to print target.

The communication unit 4 is a processing unit capable of performing facsimile communication via a public circuit and the like. Further, the communication unit 4 can also perform network communication via the network 108. Various kinds of protocols such as, e.g., TCP/IP (Transmission Control Protocol/Internet Protocol) are used in this network communication. By using the network communication, the MFP 10 can exchange various kinds of data with a desired destination (for example, the external terminal 50). The communication unit 4 includes a transmission unit 4a for transmitting various kinds of data and a reception unit 4b for receiving various kinds of data. For example, the transmission unit 4a transmits divided image data (explained later) to the external terminal 50. The transmission unit 4a also transmits a generation instruction indicating dummy divided data (explained later) are to be generated to the external terminal 50.

The storage unit 5 is constituted by a storage apparatus such as a hard disk drive (HDD).

The operation unit 6 includes an manipulation input unit 6a configured to receive input of operation performed with the MFP 10, and a display unit 6b configured to display and output various kinds of information.

In this MFP 10, an operation panel unit 6c (see FIG. 1) in a substantially plate-shape is provided. The operation panel unit 6c has a touch panel 25 (see FIG. 1) provided at the front surface side thereof. The touch panel 25 functions as a part of the manipulation input unit 6a and also functions as a part of the display unit 6b. The touch panel 25 is made by embedding a piezoelectric sensor in a liquid crystal display panel, and can display various kinds of information and receive input of various kinds of operations from an operator.

For example, the touch panel 25 displays various kinds of operation screens (a menu screen and the like) (including button images and the like). The operator can set various kinds of contents of operations of the MFP 10 and can give operation commands by pressing down buttons virtually arranged in the operation screen of the touch panel 25.

The controller 9 is incorporated in the MFP 10, and is a control apparatus centrally controlling the MFP 10. The controller 9 is constituted as a computer system including a CPU, various kinds of semiconductor memories (RAMs and ROMs), and the like. In the controller 9, the CPU achieves various kinds of processing units by executing a predetermined software program (which may be hereinafter simply referred to as a program) P1 stored in the ROM (for example, EEPROM). The program (more specifically, a program module group) P1 may be installed to the MFP 10 via, e.g., a portable recording medium such as a USB memory, or the network 108.

More specifically, as shown in FIG. 2, the controller 9 executes the program P1 to achieve various kinds of processing units including a communication control unit 11, an input control unit 12, a display control unit 13, a determination unit 14, and a generation unit 15.

The communication control unit 11 is a processing unit configured to control communication operation with another apparatus (the external terminal 50 and the like) by cooperating with the communication unit 4 and the like. For example, the communication control unit 11 transmits image data and the like to the external terminal 50.

The input control unit 12 is a control unit configured to control manipulation input operation performed with the manipulation input unit 6a (the touch panel 25 and the like). For example, the input control unit 12 controls operation for receiving manipulation input performed on an operation screen displayed on the touch panel 25.

The display control unit 13 is a processing unit configured to control display operation of the display unit 6b (touch panel 25 and the like). The display control unit 13 displays, for example, an operation screen for operating the MFP 10 on the touch panel 25.

The generation unit 15 controls operation and the like for generating multiple divided image data by dividing the scanned image of the original document into multiple areas. Since the generation unit 15 is a processing unit for generating the divided image data, the generation unit 15 may also be referred to as a "divided data generation unit".

The determination unit 14 controls operation and the like for determining whether each of the multiple divided image data is processing target data of related processing performed by the cloud server 90 (in other words, whether each of the multiple divided image data is processing target data of the cloud application). For example, when the cloud server 90 uses the OCR application 121 to perform OCR processing as the related processing, the determination unit 14 determines the divided image data including characters are processing target data of the related processing (the processing target data of the OCR application 121).

1-3. Configuration of External Terminal

Subsequently, the configuration of the external terminal 50 will be explained.

The external terminal 50 is an information input and output terminal apparatus capable of performing network communication between the MFP 10 and the cloud server 90 (which is also referred to as an information terminal or communication terminal). In this case, for example, a tablet-type terminal is shown as the external terminal 50. However, the external terminal 50 is not limited thereto. The external terminal 50 may also be a smartphone or personal computer and the like. The external terminal may be a portable-type apparatus (portable information terminal and the like) (portable terminal), or may be a fixed apparatus.

Figure 3:
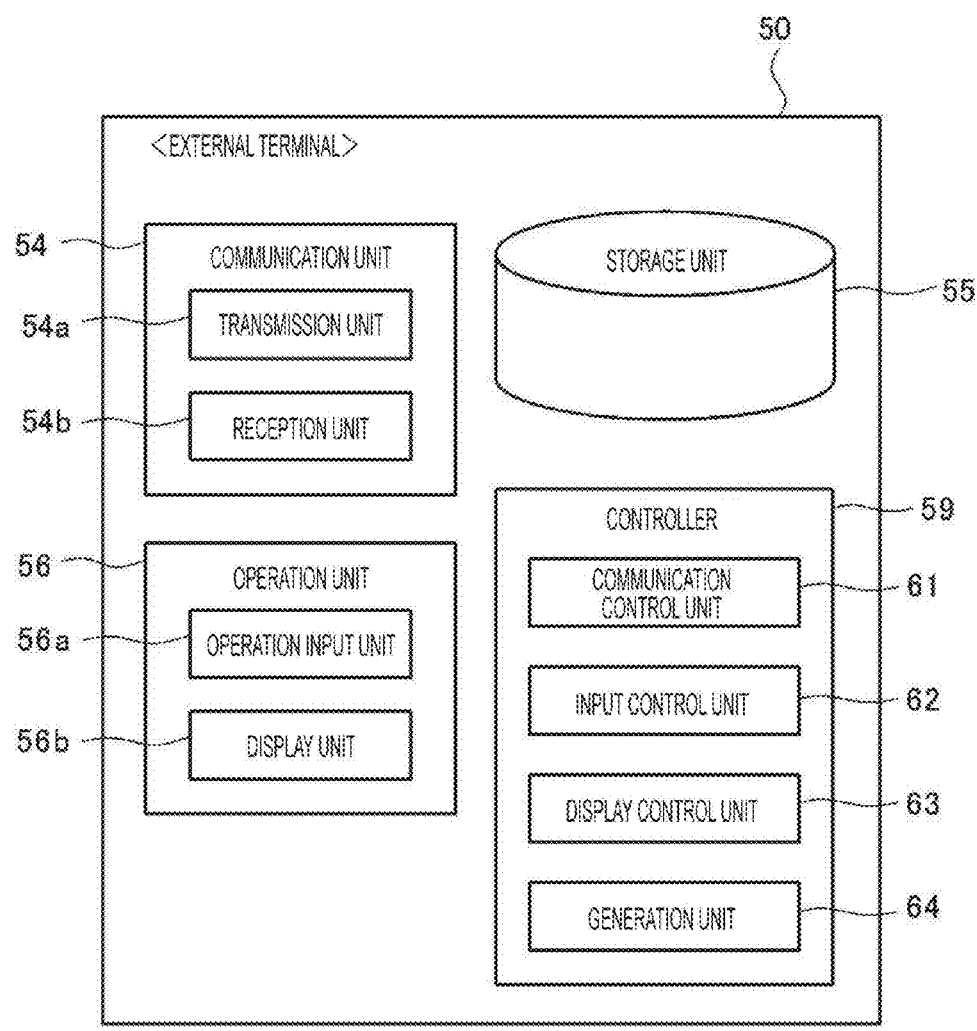
FIG. 3 is a function block diagram illustrating a schematic configuration of an external terminal.

FIG. 3 is a function block diagram illustrating a schematic configuration of the external terminal 50.

As shown in the function block diagram in FIG. 2, the external terminal 50 includes a communication unit 54, a storage unit 55, an operation unit 56, a controller 59, and the like, and achieves various kinds of functions by operating these units in a complex manner.

The communication unit 54 can perform network communication via the network 108. In this network communication, for example, various kinds of protocols such as TCP/IP (Transmission Control Protocol/Internet Protocol) are used. By using the network communication, the external terminal 50 can exchange various kinds of data with a desired destination (the MFP 10, the cloud server 90, and the like). The communication unit 54 includes a transmission unit 54a configured to transit various kinds of data and a reception unit 54b configured to receive various kinds of data. For example, the reception unit 54b receives image data about the scanned image (divided image data and the like) from the MFP 10, and the transmission unit 54a transmits the image data to the cloud server 90. The reception unit 54b also receives a processing result and the like of related processing about the image data (OCR processing and the like) from the cloud server 90. The transmission unit 54a transmits an execution instruction indicating the related processing is to be executed to the cloud server 90.

The storage unit 55 is constituted by a storage apparatus such as a nonvolatile semiconductor memory, and stores various kinds of information. For example, the storage unit 55 temporarily stores image data transmitted from the MFP 10 (divided image data and the like). The storage unit 55 also temporarily stores dummy divided data generated by the generation unit 64 on the basis of a generation instruction of dummy divided data (explained later).

The operation unit 56 includes a manipulation input unit 56a configured to receive manipulation input with the external terminal 50, and a display unit 56b configured to display and output various kinds of information. This external terminal 50 is provided with a touch panel 75 (see FIG. 1) made by embedding various kinds of sensors and the like in a liquid crystal display panel. More specifically, as shown in FIG. 1, on the front surface side of the external terminal 50 in the substantially plate-shape, the touch panel 75 is provided substantially on the entire surface except the peripheral edge portion (frame portion). This touch panel 75 functions as a user interface unit. In other words, the touch panel 75 functions as a portion of the manipulation input unit 56a, and also functions as a portion of the display unit 56b.

The controller 59 is a control apparatus incorporated into the external terminal 50 and centrally controlling the external terminal 50. The controller 59 is constituted as a computer system including a CPU, various kinds of semiconductor memories (RAMs and ROMs), and the like. In the controller 59, the CPU achieves various kinds of processing units by executing a predetermined software program (which may be hereinafter simply referred to as a program) P2 stored in storage unit (semiconductor memory and the like). The program (more specifically, a program module group) P2 may be installed to the external terminal 50 via, e.g., a portable recording medium such as a USB memory, or the network 108.

More specifically, the controller 59 executes the program P2 and the like to achieve various kinds of processing units including a communication control unit 61, an input control unit 62, a display control unit 63, and the generation unit 64.

The communication control unit 61 is a processing unit configured to control communication operation with the MFP 10 and the cloud server 90 by cooperating with the communication unit 54 and the like.

The input control unit 62 is a control unit configured to control manipulation input operation performed with the manipulation input unit 56a (the touch panel 75 and the like). For example, the input control unit 62 controls operation for receiving touch manipulation input performed on an operation screen displayed on the touch panel 75.

The display control unit 63 is a processing unit configured to control display operation of the display unit 56b (touch panel 75 and the like). The display control unit 63 displays, for example, an operation screen for performing cooperation processing performed with the MFP 10 on the touch panel 75.

The generation unit 64 is a processing unit configured to generate an electronic document on the basis of a scanned image received from the MFP 10. The generation unit 64 generates integrated image data by integrating all the divided image data received from the MFP 10. When the generation unit 64 receives a processing result of related processing (for example, text data) from the cloud server 90, the generation unit 64 generates an electronic document on the basis of the integrated image data and the processing result. Since the generation unit 64 is a processing unit configured to generate an electronic document, the generation unit 64 may also be referred to as a "document generation unit".

1-4. Operation

Figure 5:
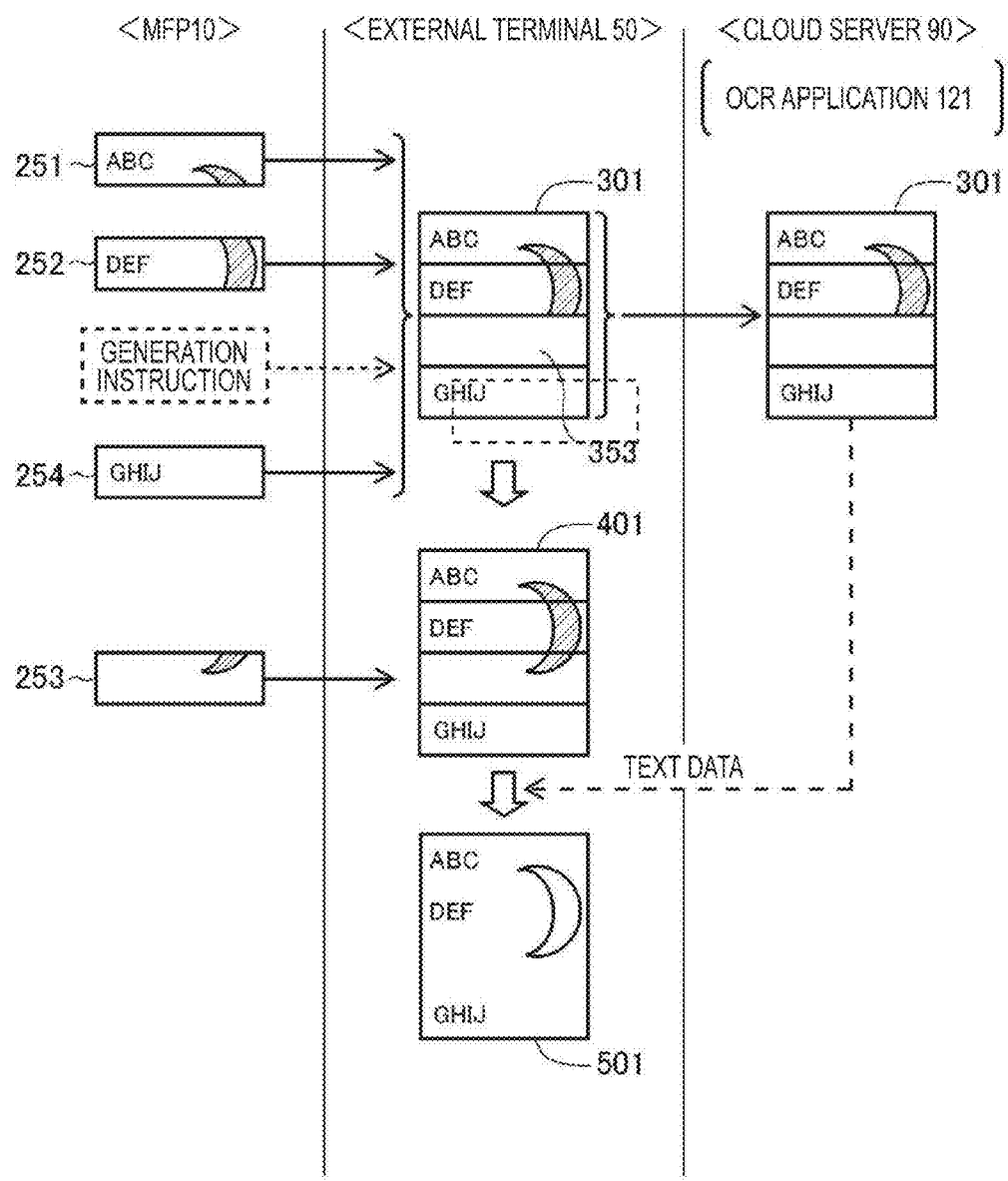
FIG. 5 is a figure illustrating an overview of operation of an electronic document generation system.
Figure 6:
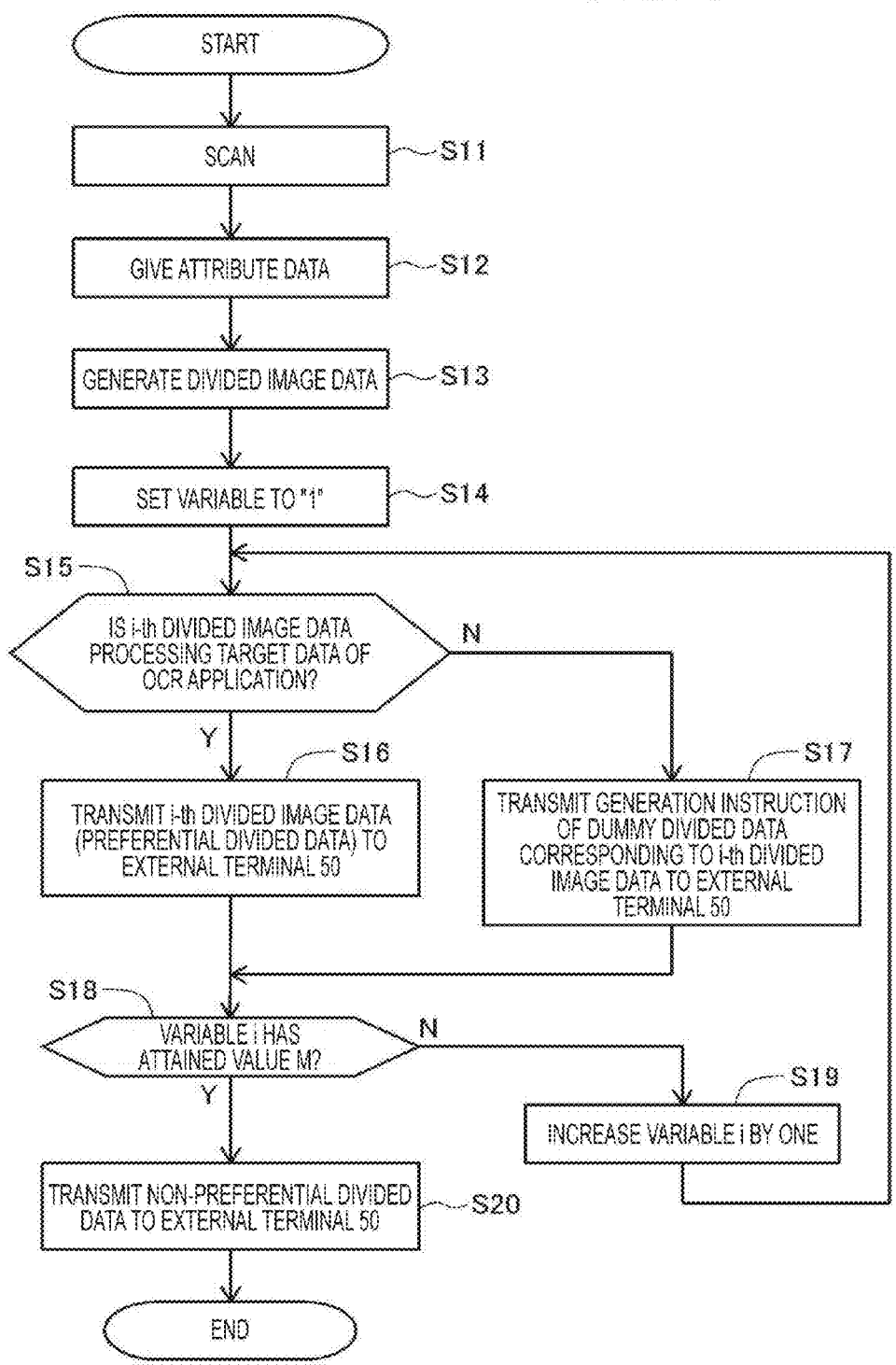
FIG. 6 is a flowchart illustrating operation of an MFP.
Figure 7:
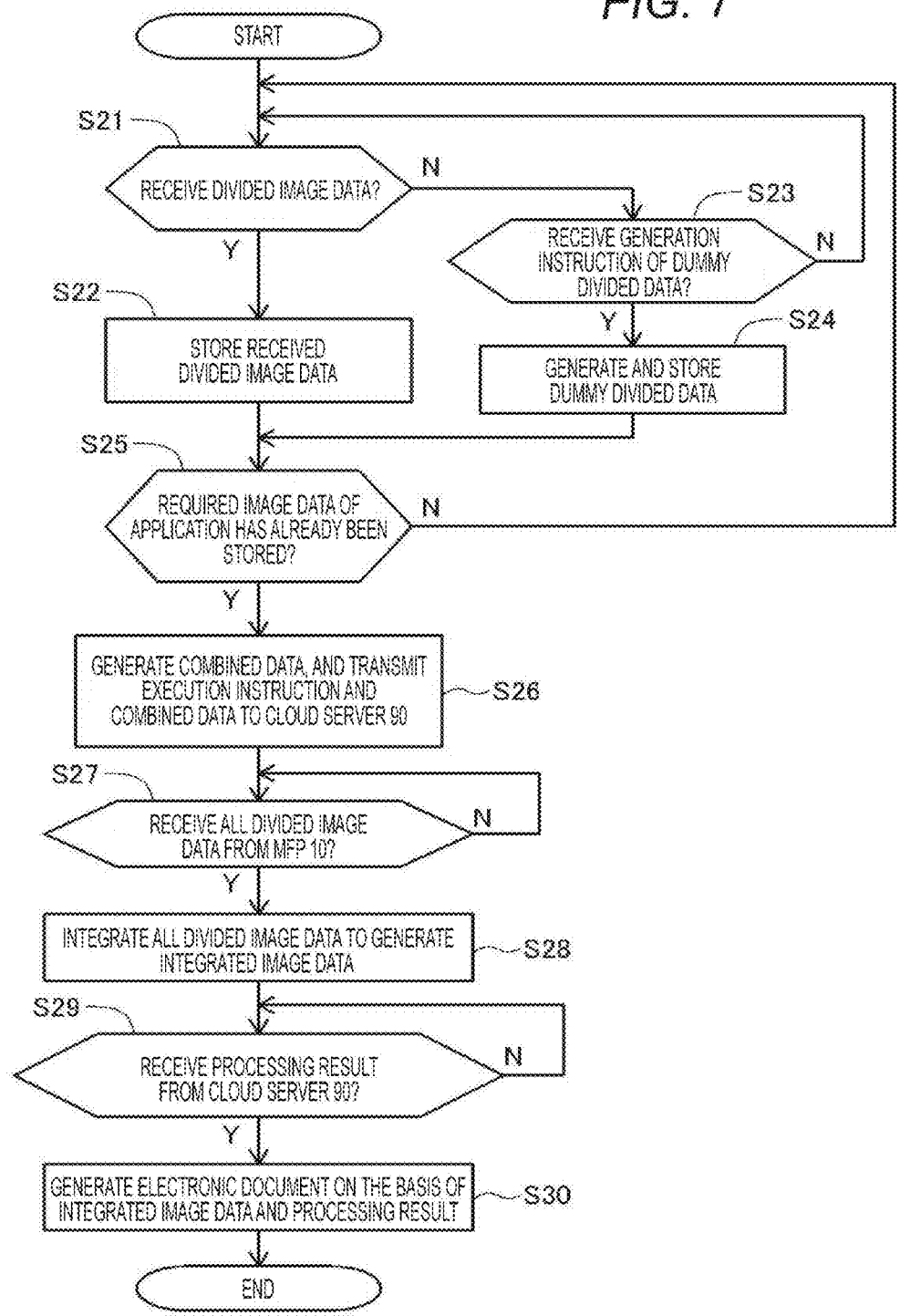
FIG. 7 is a flowchart illustrating operation of the external terminal.

FIG. 4 is a figure illustrating a scanned image 201 and divided image data 251 to 254. FIG. 5 is a figure illustrating overview of operation in the electronic document generation system 1. FIG. 6 is a flowchart illustrating operation of the MFP 10. FIG. 7 is a flowchart illustrating operation of the external terminal 50.

In this case, an aspect will be explained for example, in which the OCR processing performed by the OCR application 121 is executed as the related processing related to the generation processing of an electronic document by the cloud server 90.

<Data Transmission from MFP to External Terminal>

First, data transmission from the MFP 10 to the external terminal 50 will be explained with reference to FIGS. 5 and 6. More specifically, transmission operation and the like of various kinds of data from the MFP 10 to the external terminal 50 shown at the left side of FIG. 5 will be explained.

In step S11 (FIG. 6), the MFP 10 starts scan operation, and generates the scanned image 201 of the original document (the upper portion of FIG. 4) placed on an original document platen of the MFP 10 (for example, an automatic sheet feeding apparatus (ADF: Auto Document Feeder), an original document placing glass surface, and the like).

More specifically, the user places the original document of the scan target on the original document platen (ADF and the like) of the MFP 10, and gives a generation command of an electronic document 501 to the external terminal 50 on an operation screen (not shown) of the external terminal 50. When the external terminal 50 receives the generation command, the external terminal 50 transfers a scanned image generation command based on the generation command to the MFP 10. Then, when the MFP 10 receives the scanned image generation command from the external terminal 50, the MFP 10 starts the scan operation (step S11).

When the generation command of the electronic document 501 is given, the user designates the file format of the electronic document 501 ultimately generated in the scan processing on the operation screen. In this case, a searchable PDF (transparent text-attached PDF) is considered to be designated as the file format of the electronic document 501. This searchable PDF (transparent text-attached PDF) is an electronic document in a PDF format including an image layer having a character image, and a text layer in which a character recognition processing (OCR processing) result obtained from the character image (text data) is embedded on the basis of character position information (explained later) (in a hidden state).

In step S12, the MFP 10 applies image processing (area distinguishing processing (attribute determination processing)) to the scanned image 201, thus giving attribute data (data indicating attributes) to each pixel in the scanned image 201. More specifically, during the scanning of the original document, the MFP 10 distinguishes the attributes of each pixel in the scanned image 201 (character attribute, background (halftone dot) attribute and the like), and gives attribute data to each pixel on the basis of the distinguishing result. For example, as shown in FIG. 4, each pixel in a character string ("ABC", "DEF", "GHIJ") has a character attribute, and character attribute data are given to each pixel in the character string. Each pixel in a geometrical figure in a crescent shape has a geometrical figure attribute, and geometrical figure attribute data are given to each pixel in the geometrical figure. Further, background attribute data are given to each pixel in an area except the character string and the geometrical figure in the scanned image 201.

In step S13, the MFP 10 (the generation unit 15) generates multiple divided image data by dividing (classifying) the scanned image 201 into multiple areas. In this case, as shown in the lower portion of FIG. 4, the scanned image 201 is divided into four areas while a belt-shaped area (which may be also referred to as a band area) constituted by a predetermined number of horizontal lines is adopted as a unit, and thus divided image data 251 to 254 are generated. As shown in FIG. 4, the divided image data 251 includes a character string "ABC" and a portion of a geometrical figure in a crescent shape, and the divided image data 252 includes a character string "DEF" and a portion of the geometrical figure. The divided image data 253 includes a portion of the geometrical figure, and the divided image data 254 includes a character string "GHIJ". More specifically, the divided image data 251, 252, 254 include the characters (character attribute pixels), the divided image data 251, 252, 253 include the geometrical figure (geometrical figure attribute pixels). In other words, each of the divided image data 251, 252, 254 include the character attribute, and each of the divided image data 251, 252, 253 include the geometrical figure attribute.

In step S14 to step S19, a determination is made as to whether the divided image data 251 to 254 are processing target data of OCR processing (related processing) (processing target data of the OCR application 121), and the processing according to the determination result is executed respectively.

In step S14, the variable i (i is a natural number; i=1, . . . , M) is initially set to a value "1". It should be noted that the variable i is a natural number ranging from the value "1" to the value M, and the value M is the number of divisions of the divided image data (M=4 in this case). The 1-st to 4-th divided image data in steps S15 to S17 respectively correspond to divided image data 251 to 254.

In step S15, the determination unit 14 determines whether the i-th divided image data are processing target data of the OCR application 121. When the i-th divided image data are determined to be the processing target data of the application 121, the i-th divided image data are transmitted from the MFP 10 to the external terminal 50 (step S16). On the other hand when the i-th divided image data are determined not to be the processing target data of the application 121, a generation instruction of dummy divided data (explained later) corresponding to the i-th divided image data is transmitted from the MFP 10 to the external terminal 50 (step S17).

In this case, the determination unit 14 determines that the divided image data having the character attribute (particular attribute corresponding to the OCR application 121) is processing target data of the application. More specifically, the divided image data including the character are determined to be the processing target data.

It should be noted that the "dummy divided data" are dummy image data of multiple divided image data corresponding to the divided image data determined not to be the processing target data, and are image data transmitted, instead of the divided image data, from the external terminal 50 to the cloud server 90.

Then, in step S18, a determination is made as to whether the variable i attained the value M. When the variable i is determined to have attained the value M, the processing in step S20 is subsequently performed. On the other hand, when the variable i is determined not to have attained the value M, the variable i is increased by one (step S19), the processing in step S15 is performed again. More specifically, the processing in steps S15 to S17 is repeated until the variable i attains the value M (M=4 in this case). More specifically, the processing in step S15 is performed in order on each of the divided image data 251 to 254, and in accordance with the processing result, the processing in step S16 or step S17 is performed.

First, the determination unit 14 determines that the 1-st divided image data (divided image data having the character attribute (FIG. 4)) 251 are the processing target data of the OCR application 121 (the processing target data of the OCR processing) (step S15), and the MFP 10 (transmission unit 4a) transmits the divided image data 251 to the external terminal 50 (step S16) (also see FIG. 5). More specifically, the divided image data (251) determined to be the processing target data of the OCR application 121 are immediately transmitted from the MFP 10 to the external terminal 50.

Subsequently, the 2-nd divided image data (the divided image data having the character attribute (FIG. 4)) 252 (FIG. 4) are also determined to be the processing target data of the application 121 (step S15), and accordingly, the divided image data 252 are transmitted from the MFP 10 to the external terminal 50 (step S16) (also see FIG. 5).

The 3-rd divided image data (the divided image data not having the character attribute (FIG. 4)) 253 are determined not to be the processing target data of the application 121 (step S15), and a generation instruction indicating that the dummy divided data 353 corresponding to the divided image data 253 are to be generated is transmitted from the MFP 10 to the external terminal 50 (step S17) (also see FIG. 5). More specifically, the divided image data 253 itself determined not to be the processing target data of the application 121 are not transmitted to the external terminal 50 at this moment yet, and the generation instruction of the dummy divided data 353 is transmitted to the external terminal 50 instead of the divided image data 253. The divided image data (253) determined not to be the processing target data of the application are not immediately transmitted from the MFP 10 to the external terminal 50, and the generation instruction of the dummy divided data 353 is transmitted before transmission of the divided image data 253.

The 4-th divided image data (the divided image data having the character attribute (FIG. 4)) 254 are determined to be the processing target data of the OCR application 121 (step S15), the divided image data 254 are transmitted from the MFP 10 to the external terminal 50 (step S16) (also see FIG. 5). The divided image data 254 are transmitted to the cloud server 90 at a point in time earlier than the divided image data 253 determined not to be the processing target data of the OCR application 121.

Then, the variable i is determined to have attained the value "4" in step S18, and the processing in step S20 is subsequently performed.

In step S20, the divided image data determined not to be the processing target data (the divided image data 253 in this case) are transmitted from the MFP 10 to the external terminal 50 (also see FIG. 5).

As described above, in all of the divided image data 251 to 254, the MFP 10 transmits the divided image data 251, 252, 254 determined to be the processing target data of the application 121 at an earlier point in time (with a higher degree of precedence) to the external terminal 50. Then, the MFP 10 transmits, to the external terminal 50, the divided image data 253 determined not to be the processing target data of the application 121 at a point in time later than the transmission of the divided image data 251, 252, 254.

It should be noted that the divided image data 251, 252, 254 determined to be the processing target data of the application 121 are transmitted to the external terminal 50 at an earlier point in time, and therefore, the divided image data 251, 252, 254 may also be referred to as "preferential divided data (preferential data)". On the other hand, the divided image data 253 determined not to be the processing target data of the application are transmitted to the external terminal 50 after the preferential divided data are transmitted, and therefore, the divided image data 253 may also be referred to as "non-preferential divided data (non-preferential data)".

As described above, the MFP 10 transits the divided image data 251, the divided image data 252, the generation instruction of the dummy divided data 353, the divided image data 254, and then the divided image data 253, in this order to the external terminal 50 (see FIG. 5). It should be noted that the external terminal 50 receives various kinds of data in accordance with this order (transmission order).

<Generation Processing of Electronic Document and the Like>

Subsequently, generation processing and the like of the electronic document 501 in the external terminal 50 will be explained. More specifically, operation of the external terminal 50 and the cloud server 90 will be explained with reference to the central portion and the right portion of FIG. 5, the flowchart of FIG. 7, and the like.

First, in steps S21, S23 of FIG. 7, the external terminal 50 determines whether the data received from the MFP 10 are divided image data or the generation instruction of the dummy divided data. More specifically, the external terminal 50 analyzes the received data, and determines whether the data are divided image data or not. When the data are determined not to be divided image data, the external terminal 50 determines that the data are the generation instruction of the dummy divided data.

When the received data are determined to be divided image data (step S21), the external terminal 50 temporarily stores the divided image data to the storage unit 55 (step S22). On the other hand, the received data are determined to be the generation instruction of the dummy divided data (step S23), the external terminal 50 generates the dummy divided data, and temporarily stores the dummy divided data to the storage unit 55 (step S24).

In step S25, the external terminal 50 determines whether all the image data required to start the execution of the OCR processing performed with the OCR application 121 (which may also be referred to as "required image data") have already been stored or not. In this case, when, image data for a single page (image data corresponding to all the divided areas (four divided areas in this case)) are determined to have been stored, it is determined that the required image data for the OCR processing have already been stored. More specifically, when the divided image data having the characters (the character attribute) are received from the MFP 10 and stored, and the dummy divided data corresponding to the divided image data having no character attribute are generated and stored, it is determined that the required image data for the OCR processing have already been stored.

When the required image data are determined to have already been stored, the processing in step 26 is subsequently performed, and when the required image data are determined not to have already been stored, the processing in step S21 is performed again. More specifically, the above processing is repeatedly performed until all the image data required to start the execution of the OCR processing are stored in the storage unit 55.

As described above, the external terminal 50 receives various kinds of data from the MFP 10 in accordance with the data transmission order of the MFP 10 (see FIG. 5). More specifically, the external terminal 50 receives, in the order described here, the divided image data 251, the divided image data 252, the generation instruction of the dummy divided data 353, the divided image data 254, and then the divided image data 253 from the MFP 10 (see FIG. 5). In this case, more specifically, the following operation is performed.

First, when each of the divided image data (preferential divided data) 251, 252 are received (step S21), the divided image data 251, 252 are temporarily stored to the storage unit 55 respectively (step S22). Then, the determination indicating that the required image data for the OCR processing have not yet stored is made respectively in step S25, and the processing in step S21 is performed again.

When the generation instruction of the dummy divided data 353 is received (step S23), the dummy divided data 353 is generated by the generation unit 64 and temporarily stored to the storage unit 55 (step S24). Then, the determination indicating that the required image data for the OCR processing have not yet stored is made in step S25, and the processing in step S21 is performed again.

When the dummy divided data 353 are generated, the generation unit 64 generates the dummy divided data 353 of which data size is less than the data size of the divided image data 253. For example, the generation unit 64 generates, as the dummy divided data 353, image data of an image constituted by only the pixels in a single color (for example, white) (data compressed in a predetermined format). In this case, each of the external terminal 50 and the cloud server 90 has a data compression function and a data decompression function according to a predetermined compression format (for example, JPEG format), and can exchange data in the predetermined compression format. The dummy divided data 353 are generated as data in a predetermined compression format, and therefore, the dummy divided data 353 is of a relatively smaller size. In particular, considering that the dummy divided data 353 is constituted by only the pixels in a single color, the compression efficiency is improved, and the data size of the dummy divided data 353 is further reduced.

Further, when the divided image data (preferential divided data) 254 are received (step S21), the divided image data 254 is temporarily stored to the storage unit 55 (step S22).

At this point in time (when the storage of the divided image data 254 has been completed), the storage unit 55 has stored the divided image data 251, 252, 254 and the dummy divided data 353. In other words, all the divided image data 251, 252, 254 which are the processing target data of the OCR application 121 (which include the character attribute) have already been received, and further, the dummy divided data 353 corresponding to the divided image data 253 which are not the processing target data of the OCR application 121 (which do not have any character attribute) have been generated and stored. Thus, the required image data for the OCR application 121 (i.e., the OCR processing performed with the application 121) are determined to have already been stored in step S25.

In step S26, combined data (301) (explained subsequently) are generated by the generation unit 64, and the execution instruction of the processing performed with the application (121) and the combined data (301) are transmitted by the external terminal 50 (the transmission unit 54a) to the cloud server 90 (also see FIG. 5). As described above, before the completion of reception of all the divided image data 251 to 254 (before completion of the reception of the non-preferential divided data 253 in particular), the external terminal 50 transmits the execution instruction of the processing performed with the OCR application 121 (the execution instruction of the OCR processing) and the combined data 301 to the cloud server 90.

In this case, the combined data (301) are image data obtained by combining the dummy divided data (353) and the preferential divided data (251, 252, 254) transmitted from the MFP 10 at an earlier point in time. In this case, the combined data 301 are image data for a single page corresponding to the scanned image 201. As shown in FIG. 5, the image based on the dummy divided data 353 (the dummy image data corresponding to the non-preferential divided data 253) (dummy image) is disposed at the position of the image based on the combined data 301 corresponding to the display position of the non-preferential divided data 253 of the scanned image 201 (i.e., the area between the display area of the divided image data 252 and the display area of the divided image data 254). Likewise, the images based on the divided image data 251, 252, 254 are disposed at the positions of the image based on the combined data 301 corresponding to the display positions of the divided image data 251, 252, 254, respectively, of the scanned image 201. In particular, the image based on the dummy divided data 353 (dummy image) is disposed at the position of the image based on the combined data 301 corresponding to the display positon of the non-preferential divided data 253, so that the image based on the divided image data (preferential divided data) 254 subsequent to the divided image data (non-preferential divided data) 253 is also disposed at the original positon. As a result, the images based on the preferential divided data 251, 252, 254 are disposed at the display areas appropriate therefor.

When the cloud server 90 receives the execution instruction of the processing performed with the OCR application 121 and the combined data 301 from the external terminal 50, the OCR application 121 executes the OCR processing on the combined data 301 (also see FIG. 5). Then, when the OCR processing is completed, the cloud server 90 transmits the processing result (text data) to the external terminal 50 (also see FIG. 5). It should be noted that the cloud server 90 transmits not only the text data but also the position information at the beginning of each line of the text data (character position information (coordinate information and the like)) to the external terminal 50. Therefore, the text data can be appropriately embedded at the position of the character image corresponding to the text data.

In step S27, a determination is made as to whether all the divided image data have been received from the MFP 10 or not. In this case, when the divided image data (non-preferential divided data) 253, which is the only data that have not yet received in all the divided image data 251 to 254, are received (also see FIG. 5), the processing in step S28 is subsequently performed. It should be noted that the reception processing for receiving the non-preferential divided data 253 from the MFP 10 may be executed in parallel with the OCR processing performed with the cloud server 90.

In step S28, the generation unit 64 integrates the divided image data (251 to 254) received from the MFP 10, and generates the integrated image data (401) corresponding to the scanned image 201 (also see FIG. 5). It should be noted that the generation unit 64 executes the generation processing of the integrated image data (401) in parallel with the processing of the OCR application 121 which is being executed on the cloud server 90.

Then, when the processing result of the OCR application 121 (text data and character position information (coordinate information and the like)) are received from the cloud server 90 (step S29), the generation unit 64 generates an electronic document (text data-attached electronic document) 501 on the basis of the processing result (text data and the like) and the integrated image data 401 (step S30) (also see FIG. 5). More specifically, the generation unit 64 generates a text layer in which text data are embedded (in a hidden state) on the basis of the character position information, and generates an electronic document (searchable PDF in this case) 501 on the basis of the text layer and an image layer having the integrated image data 401.

According to the above operation, in multiple divided image data 251 to 254, the divided image data (preferential divided data) 251, 252, 254 determined to be the processing target data of the OCR application 121 (processing target data of the OCR processing) are transmitted from the MFP 10 to the external terminal 50 at an earlier point in time (before the non-preferential divided data 253 are transmitted). Then, the external terminal 50 transmits the preferential divided data 251, 252, 254, which are received at an earlier point in time, and the execution instruction of the processing performed with the OCR application 121 (the execution instruction of the OCR processing) to the cloud server 90. According to such operation, the cloud server 90 can start the related processing performed without waiting for the completion of the reception of all the divided image data 251 to 254 based on the scanned image 201 (the divided image data 253 in particular). In addition, the external terminal 50 using the processing result of the related processing can receive the processing result from the related processing from the cloud server 90 at a relatively earlier point in time, and can generate the electronic document 501 in an efficient manner.

In the above operation, the divided image data 251, 252, 254 determined to be the processing target data of the OCR application 121 are combined, and thus the combined data 301 are generated. Therefore, the OCR processing can be executed in a more reliable manner.

Figure 8:
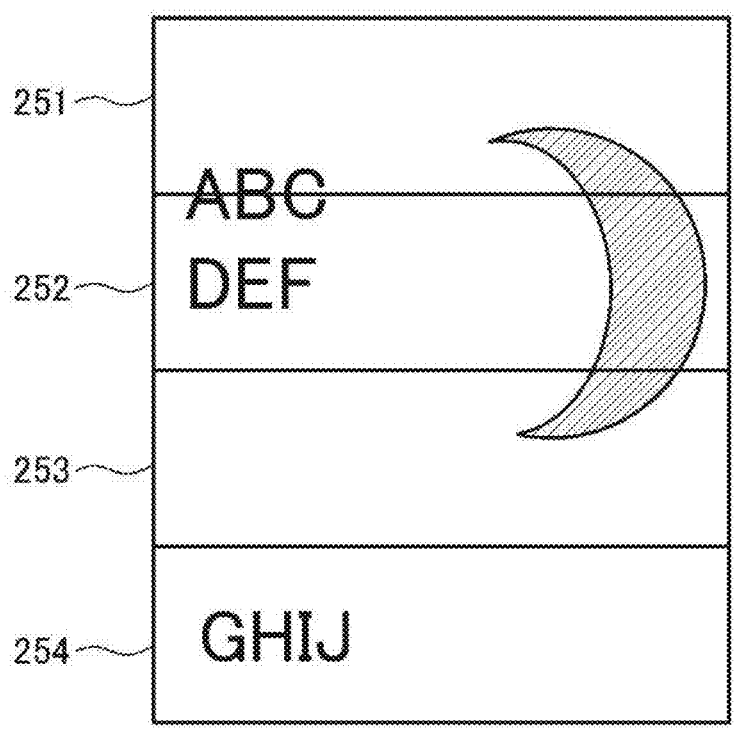
FIG. 8 is a figure illustrating divided image data.

For example, as shown in FIG. 8, when a character string "ABC" resides across the divided image data 251 and the divided image data 252, and if only the divided image data 251 are transmitted to the cloud server 90, the OCR application 121 is unable to recognize the character string "ABC" (a divided character string "ABC").

In contrast, when the combined data 301 (see FIG. 5 and the like) explained above are generated, the divided image data 251 and the divided image data 252 are combined, and therefore, the OCR application 121 can normally recognize the character string "ABC".

The divided image data 253 (non-preferential divided data) are not transmitted from the external terminal 50 to the cloud server 90, and the dummy divided data 353 of which data size is relatively less than that of the divided image data 253 are transmitted to the cloud server 90 instead of the divided image data 253. Therefore, as compared to a case where all the divided image data 251 to 254 are transmitted from the external terminal 50 to the cloud server 90, the data size of the transmission data transmitted from the external terminal 50 to the cloud server 90 can be reduced. As a result, the communication load between the external terminal 50 and the cloud server 90 can be reduced.

In addition, the dummy divided data 353 corresponding to the divided image data (non-preferential divided data) 253 are generated, and the image based on the dummy divided data 353 is disposed at the position corresponding to the display position of the divided image data 253, and thus the combined data 301 are generated. Therefore, in the image based on the combined data 301, the images based on the divided image data 251, 252, 254 (the divided image data 254 in particular) are respectively disposed at appropriate display positions. Therefore, the deviation between the character string in the scanned image 201 and the character string in the combined data 301 can be suppressed, and the processing result (text data) of the OCR processing can be added to the appropriate position with respect to the character string in the electronic document 501. In particular, the OCR processing result (text data) of the divided image data 254 can be appropriately added to the original position (instead of being added to the display position of the image based on the divided image data 253).

For example, this case showed a case where there are multiple preferential divided data in multiple divided image data 251 to 254, but the embodiment is not limited thereto. The above concept can also be applied to a case where there is a single preferential divided data in multiple divided image data 251 to 254.

For example, when only the divided image data 254 (see FIG. 4 and the like) of the divided image data 251 to 254 are determined to be the processing target data of the application 121, the MFP 10 transmits the divided image data 254 to the external terminal 50 as the preferential divided data at an earlier point in time (in a preferential manner). Before the divided image data 251 to 253 are transmitted, the MFP 10 transmits a generation instruction of dummy divided data 351 to 353 respectively corresponding to the divided image data 251 to 253 to the external terminal 50. Then, the MFP 10 transmits the divided image data 251 to 253 determined not to be the processing target data of the application 121 to the external terminal 50 after the divided image data 254 are transmitted.

The external terminal 50 generates the dummy divided data 351 to 353 in reply to the generation instruction, and generates combined data by combining the dummy divided data 351 to 353 and the divided image data 254. Then, before the completion of the reception of all the divided image data 251 to 254, the external terminal 50 transmits the execution instruction of the application 121 and the combined data to the cloud server 90.

The above concept may also be realized in this manner.

2. Second Embodiment

For example, the first embodiment explained above showed a case where the cloud server 90 executes single related processing (OCR processing) with a single application (the OCR application 121).

For example, the second embodiment shows a case where a cloud server 90 executes multiple pieces of related processing performed with multiple applications.

It should be noted that the second embodiment is a modification of the first embodiment. In the explanation below, the difference from the first embodiment will be mainly explained.

Figure 9:
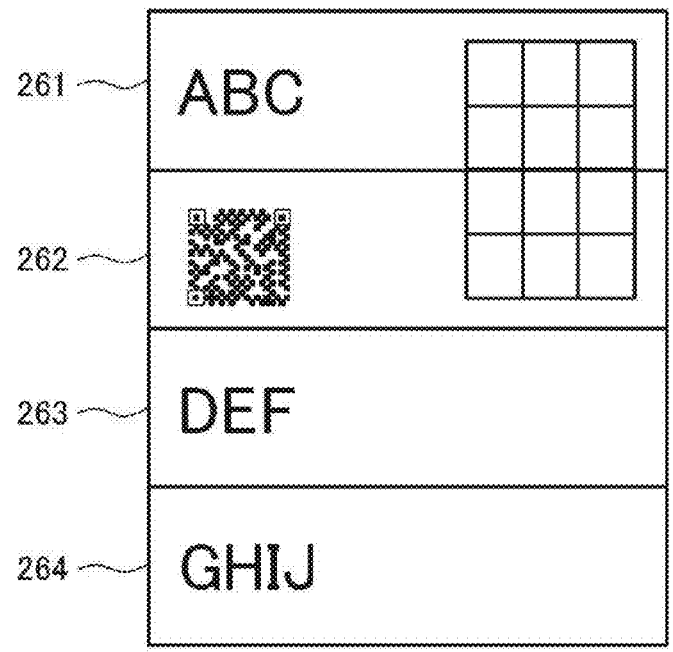
FIG. 9 is a figure illustrating a scanned image and divided image data according to a second embodiment.
Figure 10:
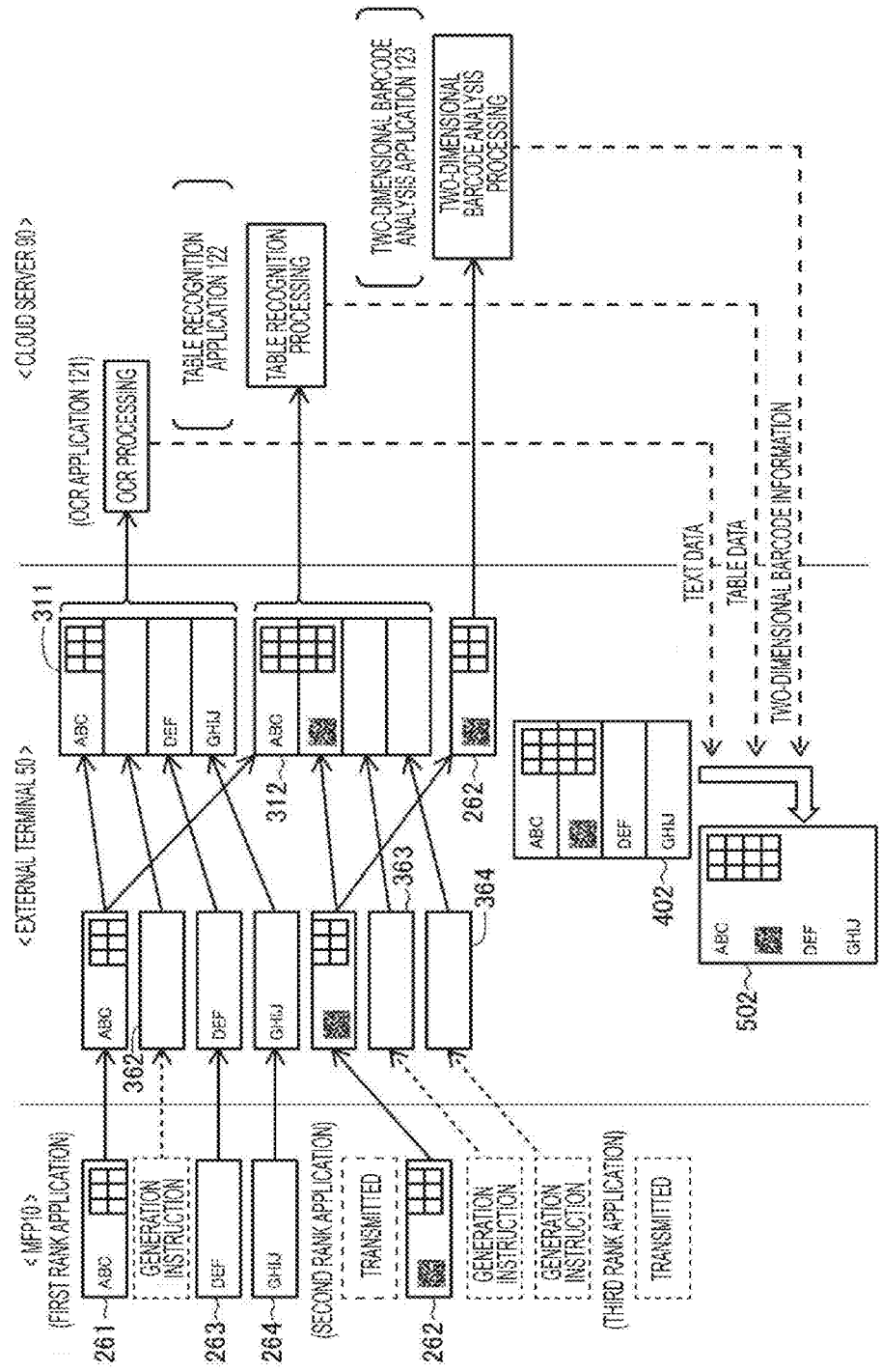
FIG. 10 is a figure illustrating an overview of operation of an electronic document generation system according to the second embodiment.
Figure 11:
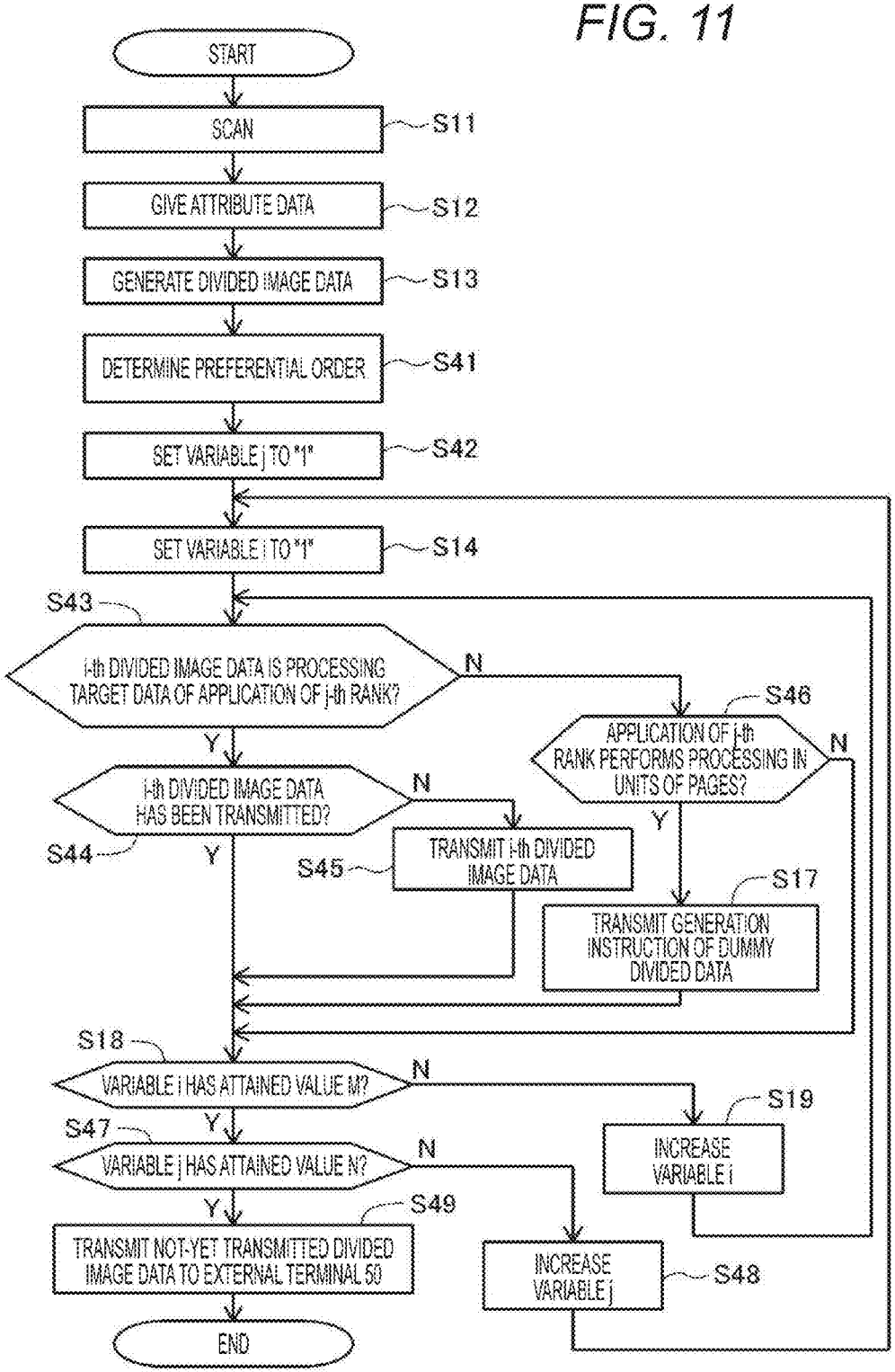
FIG. 11 is a flowchart illustrating operation of an MFP according to the second embodiment.
Figure 12:
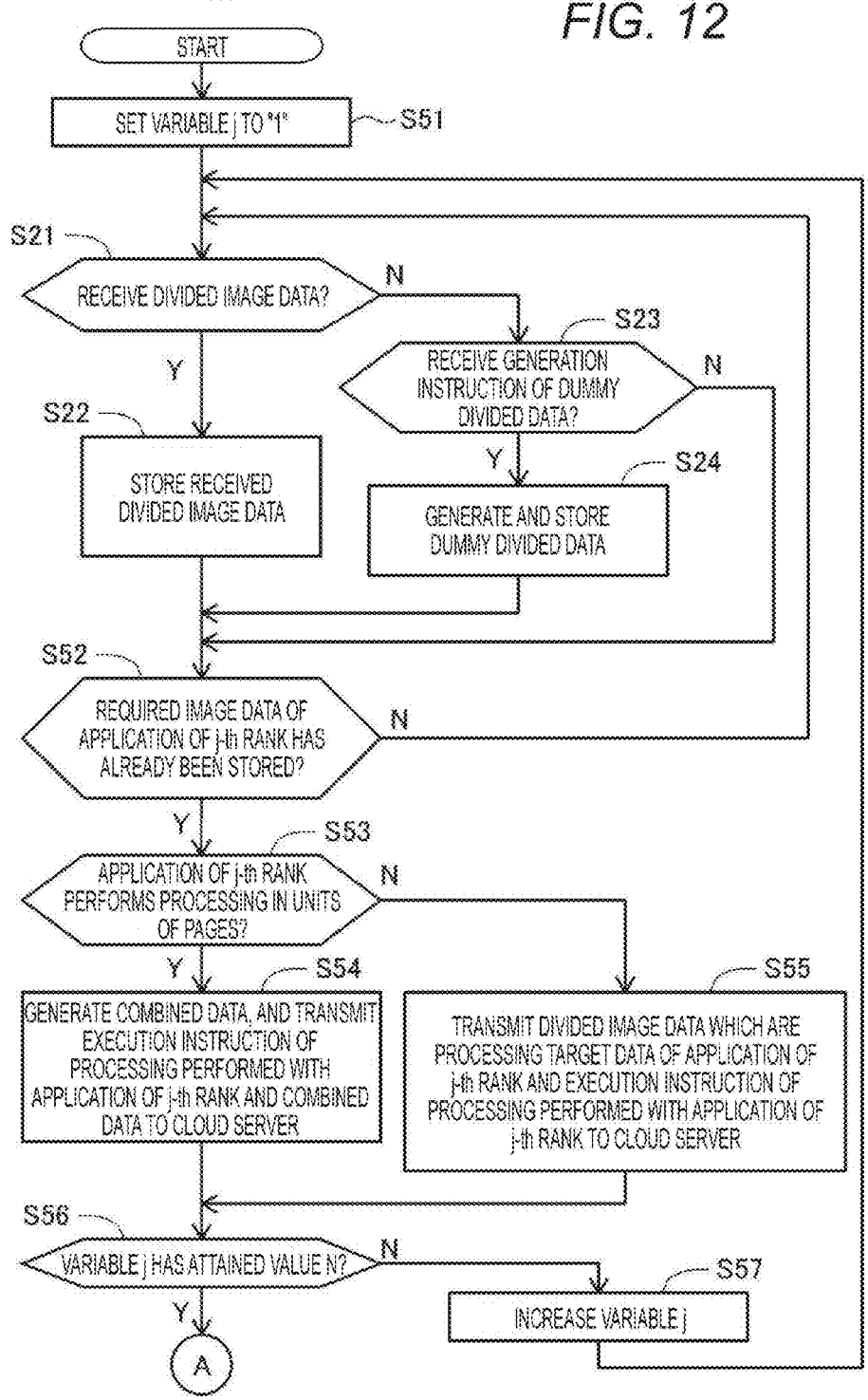
FIG. 12 is a flowchart illustrating operation of an external terminal according to the second embodiment.
Figure 13:
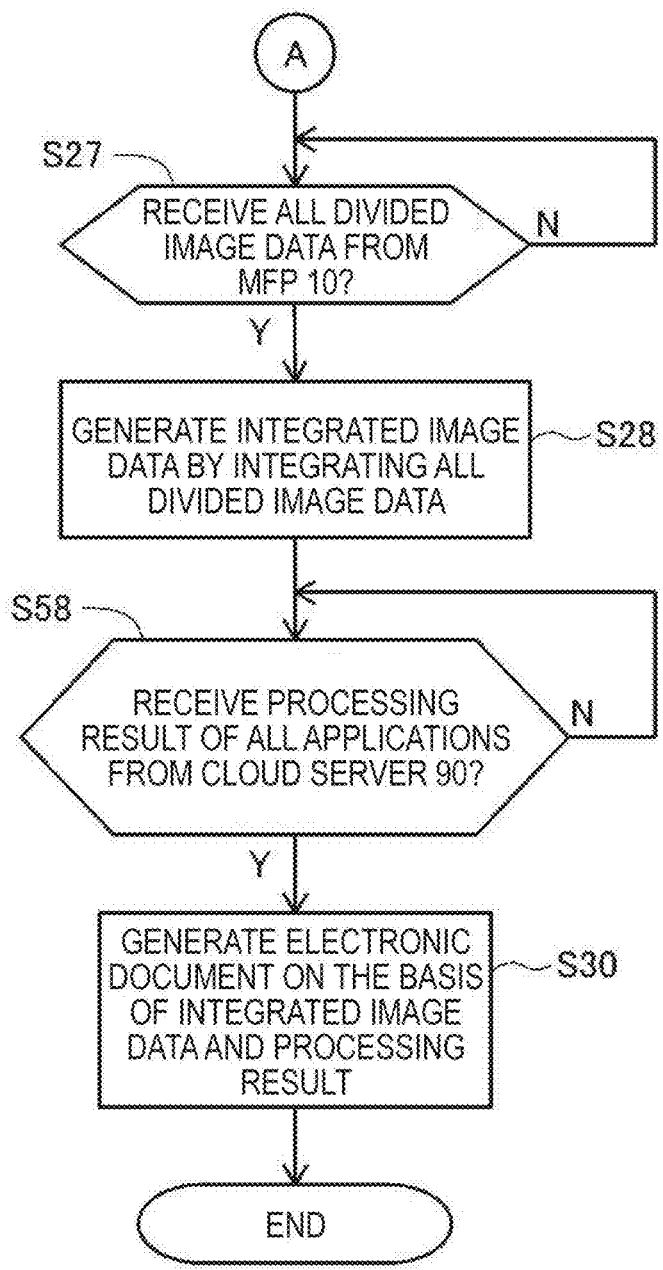
FIG. 13 is a flowchart illustrating operation of the external terminal according to the second embodiment.

FIG. 9 is a figure illustrating a scanned image 202 and divided image data 261 to 264. FIG. 10 is a figure illustrating an overview of operation of an electronic document generation system 1 according to the second embodiment. FIG. 11 is a flowchart illustrating operation of an MFP 10 according to the second embodiment. FIGS. 12 and 13 are flowcharts illustrating operation of an external terminal 50 according to the second embodiment.

For example, the second embodiment shows a case where an OCR application 121, a table (table) recognition application 122, and a two-dimensional barcode analysis application 123 are installed to the cloud server 90 as applications for executing the multiple pieces of related processing. More specifically, the cloud server 90 executes three related processing performed with the three applications 121 to 123.

It should be noted that the table recognition application 122 performs table recognition processing (image recognition processing) to recognize a table structure included in image data (lines of a table and the like), and generates, as a processing result, table data having information about the table structure (for example, data in a file format of table calculation software). The cloud server 90 transmits the table data and coordinate information about a reference point of the table data (table position information (coordinate information and the like)) to the external terminal 50, and the external terminal 50 generates an electronic document by adding the table data to an image layer having a table image on the basis of the table position information.

The two-dimensional barcode analysis application 123 analyzes information (link destination URL and the like) embedded in a two-dimensional barcode (QR code (registered trademark) and the like) on the basis of a two-dimensional barcode attribute included in the image data by performing two-dimensional barcode analysis processing. Then, the two-dimensional barcode information (link destination URL and the like) is output as a processing result, and the external terminal 50 adds the processing result (link destination URL and the like) to the two-dimensional barcode. Thereafter, for example, when the user presses down (touches) the two-dimensional barcode in the electronic document in which the link destination URL is added to the two-dimensional barcode, a screen based on the link destination URL is displayed on the operation screen of the external terminal 50.

<Data Transmission from MFP to External Terminal>

First, the data transmission from the MFP 10 to the external terminal 50 will be explained with reference to FIGS. 10 and 11.

When the scanned image 202 of the original document (the upper portion of FIG. 9) is generated by the MFP 10 (step S11), the attribute data are given to each pixel in the scanned image 202 (step S12). In the second embodiment, as shown in FIG. 9, the scanned image 202 includes character strings ("ABC", "DEF", "GHIJ"), a table, and two-dimensional barcode. The character attribute data are given to the character strings ("ABC", "DEF", "GHIJ") (more specifically, the character attribute data are given to each pixel of the character string). The table attribute data are given to the table (more specifically, the table attribute data are given to each pixel of the "table"). Further, the two-dimensional barcode attribute data are given to the two-dimensional barcode (more specifically, the two-dimensional barcode attribute data are given to each pixel of the two-dimensional barcode).

Then, in step S13, the divided image data (261 to 264) are generated (see the lower portion of FIG. 9). In this case, as shown in FIG. 9, the divided image data 261 include the character string "ABC" and a portion of the table. The divided image data 262 include the two-dimensional barcode and a portion of the table. The divided image data 263 include the character string "DEF". The divided image data 264 include the character string "GHIJ". More specifically, each of the divided image data 261, 263, 264 has the character attribute, and each of the divided image data 261, 262 has the table attribute. Further, the divided image data 262 include the two-dimensional barcode attribute.

In step S41 subsequent thereto, the preferential order (preferential rank) of each application is determined on the basis of a required processing time of the application. More specifically, for multiple applications, the required processing time (reference processing time) of each of the applications for the scanned image is determined, and the preferential order of multiple applications is determined in accordance with the descending order of the required processing time. In other words, the preferential order of multiple (types of) related processing performed with the multiple applications different from each other is set on the basis of the required processing time of each related processing. The preferential order is set in the descending order (i.e., a large value comes first) of the required processing time of each of the multiple pieces of related processing. Then, the related processing in question is set from among multiple pieces of related processing. The related processing in question is set in order in accordance with the preferential order.

In this case, the preferential order of the three applications (three related processing) is set in the descending order of the required processing time (an application taking a longer processing time comes first). More specifically, the OCR application 121 having the longest required processing time is determined to be the application having the first preferential rank (the first rank application). The table recognition application 122 having the second longest required processing time subsequent to the OCR application 121 is determined to be the application having the second preferential rank (the second rank application). Further, the two-dimensional barcode analysis application 123 having the shortest required processing time is determined to be the application having the third preferential rank (the third rank application). In other words, the OCR processing, the table recognition processing, and the two-dimensional barcode analysis processing are determined to be processing having the first, second, and third preferential ranks, respectively, in this order. It should be noted that the "required processing time (average time or reference time)" of each application (each related processing) is considered to be stored in the storage unit 5 of the image forming apparatus 10 in advance (more specifically, information indicating the required processing time is considered to be stored in the storage unit 5 of the image forming apparatus 10 in advance). The above preferential ranks are set on the basis of the "required processing time".

In step S42 and steps subsequent thereto, the processing of the multiple applications are executed in accordance with the preferential ranks of the multiple applications.

In step S42, the variable j (j is a natural number; j=1, ..., N) is initially set to a value "1". It should be noted that the variable j is a natural number ranging from the value "1" to the value N, and the value N is the number of applications installed in the cloud server 90 (N=3 in this case). As explained below, the repetition processing performed with regard to the variable i (e.g., determination processing for determining as to whether each of multiple divided image data Di is the processing target data of the application Aj having the j-th preferential rank) is repeatedly executed until the variable j attains a value "3". In other words, the repetition processing performed with regard to the variable i is performed with the first to third rank applications (one of the three applications which is successively set in the descending order of the required processing time).

The repetition processing performed with regard to the variable i will be explained. The repetition processing performed with regard to the variable i is processing including, e.g., the determination processing for determining as to whether each of multiple divided image data Di is the processing target data of the application Aj having the j-th rank. The repetition processing performed with regard to the variable i is also expressed as processing for transmitting required data for each application to the cloud server 90.

In step S14, the variable i (i is a natural number; i=1, . . . , M) is initially set to a value "1". It should be noted that the variable i is a natural number ranging from the value "1" to the value M, and the value M is the number of divisions of the divided image data (M=4 in this case). The 1-st to 4-th divided image data Di in steps S43 to S45 respectively correspond to the divided image data 261 to 264.

In step S43, the determination unit 14 determines whether the i-th divided image data Di is the processing target data of the application of the j-th rank Aj (in other words, the processing target data of the related processing having the j-th preferential rank).

When the i-th divided image data Di are determined to be the processing target data of the application of the j-th rank Aj, a determination is made as to whether the i-th divided image data Di have already been transmitted to the external terminal 50 or not in step S44. When the i-th divided image data Di is determined to have been transmitted, the processing in step S18 is subsequently performed. On the other hand, when the i-th divided image data Di is determine not to have been transmitted, the i-th divided image data Di are transmitted from the MFP 10 to the external terminal 50 (step S45).

When the i-th divided image data Di are determined not to be the processing target data of the application of the j-th rank Aj in step S43, a determination is made as to whether the application of the j-th rank Aj is an application processed in units of pages (which may also be referred to as page unit processing application) in step S46. The determination processing in step S46 may also be expressed as processing for determining whether the j-th rank related processing is the page unit related processing (related processing processed in units of pages) or not. In this case, the OCR application 121 and the table recognition application 122 are considered to be applications processed in units of pages.

When the application of the j-th rank Aj is determined to be the page unit processing application, the generation instruction of the dummy divided data corresponding to the i-th divided image data Di (the divided image data determined not to be the processing target data) is transmitted from the MFP 10 to the external terminal 50 (step S17). On the other hand, when the application of the j-th rank Aj is determined not to be the page unit processing application, the processing in step S18 is subsequently performed.

The processing performed with regard to the variable i explained above is repeatedly performed until the variable i attains the value M (M=4 in this case). More specifically, when the variable i is determined not to have attained the value M in step S18, the variable i is increased by one (step S19), and the processing in step S43 is performed again. Then, when the processing is repeatedly performed until the variable i attains a value M (M=4 in this case), and the variable i is determined to have attained the value M in step S18, the processing in step S47 is subsequently performed.

In step S47, a determination is made as to whether the variable j has attained a value N (N=3 in this case). When the variable j is determined to have attained the value N, the processing in step S49 is subsequently performed. On the other hand, when the variable j is determined not to have attained the value N, the variable j is increased by one (step S48), and the processing in step S14 is performed again.

More specifically, the above processing that is repeated while the variable i has the value "1" to "4" is performed in order and repeatedly while the variable j has the value "1" to "3". In other words, the processing on the 1-st to 4-th divided image data 261 to 264 is performed with the first to third rank applications in order. In this case, more specifically, the following operation is performed.

First, the processing in a case where the variable j is set to the value "1" will be explained. More specifically, the following processing is performed with the first rank application (OCR application) 121. In this case, the divided image data having the character attribute are determined to be the processing target data of the OCR application 121 (the processing target data for the OCR processing).

The 1-st divided image data (the divided image data having the character attribute (FIG. 9)) 261 are determined to be the processing target data of the OCR application 121 (step S43), and the processing in step S44 is subsequently performed.

At this point in time, the divided image data (the preferential divided data for the OCR application 121) 261 have not yet been transmitted to the external terminal 50. For this reason, the divided image data 261 are determined not to have been transmitted to the external terminal 50 (step S44), and the divided image data 261 are transmitted from the MFP 10 to the external terminal 50 (step S45) (also see FIG. 10).

The 2-nd divided image data (the divided image data not having the character attribute (FIG. 9)) 262 are determined not to be the processing target data of the OCR application 121 (step S43), and the processing in step S46 is subsequently performed.

In this case, the OCR application 121 is the page unit processing application, and accordingly, the application 121 of the first rank is determined to be the page unit processing application in step S46, and the processing in step S17 is subsequently performed.

Then, in step S17, the generation instruction of the dummy divided data 362 corresponding to the divided image data (the non-preferential divided data for the application 121 having the first preferential rank) 262 is transmitted from the MFP 10 to the external terminal 50 (also see FIG. 10). More specifically, the divided image data 262 have not yet transmitted to the external terminal 50 at this point in time, and instead of the divided image data 262, the generation instruction of the dummy divided data 362 is transmitted to the external terminal 50.

The 3-rd, 4-th divided image data (the divided image data having the character attribute (FIG. 9)) 263, 264 are respectively determined to be the processing target data of the OCR application 121 (step S43), and the processing in step S44 is subsequently performed.

The divided image data (the preferential divided data for the application 121 having the first preferential rank) 263, 264 have not yet been transmitted to the external terminal 50. Therefore, in step S44, the divided image data 263, 264 are respectively determined not to have been transmitted to the external terminal 50, and in step S45, the divided image data 263, 264 are respectively transmitted from the MFP 10 to the external terminal 50 (also see FIG. 10).

Then, the variable i is determined to have attained the value "4" in step S18, and the processing in steps S47, S48 are performed and then, step S14 is performed again.

In the above processing performed on the first preferential application 121, the divided image data 261, the generation instruction of the dummy divided data 362, the divided image data 263, and then the divided image data 264 are transmitted from the MFP 10 to the external terminal 50 (see FIG. 10). More specifically, of all the divided image data 261 to 264, the divided image data 261, 263, 264 determined to be the processing target data of the OCR application 121 are transmitted from the MFP 10 to the external terminal 50 at an earlier point in time. Further, the dummy divided data 362 corresponding to the divided image data 262 determined not to be the processing target data are transmitted from the MFP 10 to the external terminal 50 before the divided image data 262 are transmitted.

Subsequently, the processing in a case where the variable j is set to the value "2" will be explained. More specifically, the following processing is performed on the application having the second preferential rank (table recognition application) 122. In this case, the divided image data having the table attribute are determined to be the processing target data of the table recognition application 122.

The 1-st, 2-nd divided image data (the divided image data having the table attribute (FIG. 9)) 261, 262 are respectively determined to be the processing target data of the table recognition application 122 (step S43), and the processing in step S44 is subsequently performed.

The divided image data (the preferential divided data for the application 122 having the second preferential rank) 261 have already been transmitted to the external terminal 50, and therefore, the processing in step S18 is subsequently performed. More specifically, the MFP 10 does not transmit the already-transmitted divided image data 261 to the external terminal 50 again.

The divided image data (the preferential divided data for the application 122 having the second preferential rank) 262 have not yet been transmitted to the external terminal 50. Therefore, the divided image data 262 are determined not to have been transmitted to the external terminal 50 (step S44), and the divided image data 262 are transmitted from the MFP 10 to the external terminal 50 (step S45) (also see FIG. 10).

The 3-rd, 4-th divided image data (the divided image data not having the table attribute (FIG. 9)) 263, 264 are respectively determined not to be the processing target data of the table recognition application 122 (step S43), and the processing in step S46 is subsequently performed.

In this case, the table recognition application 122 is the page unit processing application, and accordingly, the application 122 of the second rank is determined to be the page unit processing application in step S46, and the processing in step S17 is subsequently performed.

In step S17, the generation instructions of the dummy divided data 363, 364 corresponding to the divided image data 263, 264, respectively, is transmitted from the MFP 10 to the external terminal 50 (also see FIG. 10).

Then, the variable i is determined to have attained the value "4" in step S18, and the processing in steps S47, S48 are performed and then, step S14 is performed again.

In the above processing performed on the application 122 of the second rank, the divided image data 262, the dummy divided data 363, and the dummy divided data 364 are transmitted from the MFP 10 to the external terminal 50 (see FIG. 10).

Further, the processing in a case where the variable j is set to the value "3" will be explained. More specifically, the following processing is performed on the application having the third preferential rank (two-dimensional barcode analysis application) 123. In this case, the divided image data having the two-dimensional barcode attribute are determined to be the processing target data of the two-dimensional barcode analysis application 123.

The 1-st, 3-rd and 4-th divided image data (the divided image data not having the two-dimensional barcode attribute (FIG. 9)) 261, 263, and 264 are respectively determined not to be the processing target data of the two-dimensional barcode analysis application 123 (step S43), and the processing in step S46 is subsequently performed.

In this case, the two-dimensional barcode analysis application 123 is not the page unit processing application, and accordingly, the third rank application 123 is respectively determined not to be the page unit processing application (step S46), and the processing in step S18 is subsequently performed.

On the other hand, the 2-nd divided image data (the divided image data having the two-dimensional barcode attribute (FIG. 9)) 262 is determined to be the processing target data of the two-dimensional barcode analysis application 123 (step S43), and the processing in step S44 is subsequently performed.

The divided image data (the preferential divided data for the application 123 having the third preferential rank) 262 has already been transmitted to the external terminal 50, and therefore, the processing in step S18 is subsequently performed. More specifically, the MFP 10 does not transmit the already-transmitted divided image data 262 to the external terminal 50 again.

Then, the variable i is determined to have attained the value "4" in step S18, and further, the variable j is determined to have attained the value "3" in step S47, and the processing in step S49 is subsequently performed.

In step S49, the divided image data that have not yet been transmitted are transmitted from the MFP 10 to the external terminal 50. In this case, all the divided image data 261 to 264 have already been transmitted to the external terminal 50 (there is no divided image data that have not yet been transmitted), and therefore, the processing in step S49 is not performed.

As described above, the MFP 10 determines whether, with regard to the applications in question 121 to 123 which are set in order in accordance with the descending order of the required processing time, a determination is made as to whether each of the divided image data 261 to 264 is the processing target data of the application in question or not. Then, of all the divided image data 261 to 264, the MFP 10 transmits the divided image data determined to be the processing target data of the application in question to the external terminal 50 at an earlier point in time.

As described above, the MFP 10 transmits various kinds of data to the external terminal 50 (see FIG. 10) in the following transmission order: the divided image data 261, the generation instruction of the dummy divided data 362, the divided image data 263, the divided image data 264, the divided image data 262, the generation instruction of the dummy divided data 363, and then the generation instruction of the dummy divided data 364. It should be noted that the external terminal 50 receives various kinds of data in accordance with the transmission order.

<Generation Processing and the Like of Electronic Document>

Subsequently, the generation processing and the like of the electronic document 502 performed by the external terminal 50 will be explained with reference to FIGS. 10, 12, and 13.

The external terminal 50 sets the application in question of multiple applications in the same order as the processing order of the applications performed by the MFP 10 (the order of the applications which are set in the descending order of the required processing time) (step S51, S57). In other words, in the multiple pieces of related processing, the related processing in question is set in the same order as the preferential order that is set by the MFP 10. For example, the type information of multiple applications as well as information about the preferential order of the multiple applications are transmitted from the MFP 10 to the external terminal 50, and on the basis of the information, the external terminal 50 determines the related processing in question from among multiple pieces of related processing in order. The divided image data determined to be the processing target data of the application in question (the processing target data of the related processing in question) are transmitted from the external terminal 50 to the cloud server 90 (steps S54, S55), and the related processing in question made by the application in question is executed by the cloud server 90.

More specifically, first, in step S51 (FIG. 12), the variable j is set to the value "1". As described above, the variable j is a natural number of a value "1" to N, and the value N is the number of applications installed to the cloud server 90 (N=3 in this case).

The processing in steps S21 to S24 respectively have the same contents as the processing in steps S21 to S24 of FIG. 7.

In step S52, a determination is made as to whether the required image data of the application of the j-th rank (all the image data required for starting execution) have been stored or not. When the required image data of the application of the j-th rank are determined not to have been already been stored, the processing in step S21 is performed again. When the required image data of the application of the j-th rank are determined to have been stored, a determination is made as to whether the application of the j-th rank is the page unit processing application (the application processed in units of pages) in step S53.

When the application of the j-th rank is determined to be the page unit processing application in step S53, the processing in step S54 is subsequently performed. Then, in step S54, the combined data are generated by the generation unit 64, and the execution instruction of the processing performed with the application of the j-th rank (i.e., the execution instruction of the j-th related processing) and the combined data are transmitted from the external terminal 50 to the cloud server 90.

When the application of the j-th rank is determined not to be the page unit processing application in step S53, the processing in step S55 is subsequently performed. Then, in step S55, the execution instruction of the processing performed with the application of the j-th rank and the divided image data determined to be the processing target data of the application of the j-th rank are transmitted from the external terminal 50 to the cloud server 90.

In step S56, a determination is made as to whether the variable j has attained the value N (N=3 in this case) or not. When the variable j is determined to have attained the value N, the processing in step S27 of FIG. 13 is subsequently performed. On the other hand, when the variable j is determined not to have attained the value N, the variable j is increased by one (step S57), and the processing in step S21 is performed again.

Reception operation of various kinds of data from the MFP 10 and operation subsequent thereto will be hereinafter explained in a more specific manner. As shown in FIG. 10, the external terminal 50 receives various kinds of data in accordance with the transmission order of various kinds of data transmitted from the MFP 10 to the external terminal 50 (in the following order: the divided image data 261, the generation instruction of the dummy divided data 362, the divided image data 263, the divided image data 264, the divided image data 262, the generation instruction of the dummy divided data 363, and then the generation instruction of the dummy divided data 364).

First, the external terminal 50 performs the processing of the application having the first preferential rank (OCR application) 121 (j=1). When the divided image data 261, 263, 264 having the character attribute are received and stored, and the dummy divided data 362 corresponding to the divided image data 262 not having any character attribute are generated and stored, this application 121 determines that the required image data for the OCR processing have already been stored in step S52.

More specifically, when the divided image data 261 are received (step S21) (also see FIG. 10), and the divided image data 261 are temporarily stored to the storage unit 55 (step S22). Subsequently, the processing in step S52 is performed and then, step S21 is performed again.

When the generation instruction of the dummy divided data 362 is received (step S23) (also see FIG. 10), the dummy divided data 362 are generated and temporarily stored to the storage unit 55 (step S24). Subsequently, the processing in step S52 is performed and then, step S21 is performed again.

Further, when the divided image data 263, 264 are respectively received (step S21) (also see FIG. 10), the divided image data 263, 264 are respectively temporarily stored to the storage unit 55 (step S22).

When the reception of the divided image data 264 is completed, and the divided image data 264 are stored, the storage unit 55 has stored the divided image data 261, 263, 264 and the dummy divided data 362. Accordingly, the required image data of the first rank application (OCR application) 121 are determined to have already been stored in step S52, and the processing in step S53 is subsequently performed.

In step S53, the application 121 of the first rank is determined to be the page unit processing application, and the processing in step S54 is subsequently performed.

Then, in step S54, the divided image data (261, 263, 264) and the dummy divided data 362 are combined to generate the combined data 311, and the execution instruction of the processing performed with the OCR application 121 (the execution instruction of the OCR processing) and the combined data 311 are transmitted from the external terminal 50 to the cloud server 90 (see FIG. 10). As shown in FIG. 10, the image according to the dummy divided data 362 is arranged at the position of the image based on the combined data 311 corresponding to the display positon of the divided image data 262 in the scanned image 202.

When the cloud server 90 receives the execution instruction of the processing performed with the OCR application 121 and the combined data 311 from the external terminal 50, the cloud server 90 causes the OCR application 121 to execute the OCR processing on the combined data 311 (see FIG. 10). When the OCR processing performed with the OCR application 121 is completed, the cloud server 90 transmits the processing result (text data and character position information) of the application 121 (i.e., the OCR processing performed with the application 121) to the external terminal 50.

Thereafter, the variable j is determined not to have attained the value N in step S56, the processing in step S57 is performed again (i.e., the variable j is updated with the value "2"), and then step S21 is performed again.

Subsequently, the application having the second preferential rank (table recognition application) 122 (j=2) will be hereinafter explained. When the divided image data 261, 262 having the table attribute are received and stored, and the dummy divided data 363, 364 corresponding to the divided image data 263, 264 not having any table attribute are generated and stored, this application 122 determines that the required image data for the application 122 have already been stored in step S52.

When the external terminal 50 receives the divided image data 262 from the MFP 10 (step S21) (also see FIG. 10), the divided image data 262 are temporarily stored to the storage unit 55 (step S22). The processing in step S52 is performed, and then step S21 is performed again. The divided image data 261 are already received and stored in the storage unit 55.

Further, when the external terminal 50 respectively receives the generation instruction of the dummy divided data 363, 364 (step S23) (also see FIG. 10), the external terminal 50 respectively generates the dummy divided data 363, 364 and temporarily stores the dummy divided data 363, 364 to the storage unit 55 (step S24).

When the dummy divided data 364 are generated and stored, the storage unit 55 has stored the divided image data 261, divided image data 262, dummy divided data 363 and dummy divided data 364 (i.e., the divided image data 263, 264 and the dummy divided data 362 have also been stored). Then, the required image data for the second rank application (the table recognition application) 122 are determined to have already been stored in step S52, and the processing in step S53 is subsequently performed.

In step S53, the application 122 of the second rank is determined to be the page unit processing application, and the processing in step S54 is subsequently performed.

Then, in step S54, the divided image data 261, the divided image data 262, the dummy divided data 363, and the dummy divided data 364 are combined to generate the combined data 312, and the execution instruction of the processing performed by the table recognition application 122 and the combined data 312 are transmitted from the external terminal 50 to the cloud server 90 (see FIG. 10). As shown in FIG. 10, the images based on the dummy divided data 363, 364 are arranged at the positions of the image based on the combined data 312 respectively corresponding to the display positions of the divided image data 263, 264 of the scanned image 202.

When the cloud server 90 receives the execution instruction of the processing performed with the table recognition application 122 and the combined data 312 from the external terminal 50, the table recognition application 122 executes the table recognition processing on the combined data 312 (see FIG. 10). When the table recognition processing performed with the table recognition application 122 is completed, the cloud server 90 transmits the processing result (table data and table position information) of the table recognition application 122 (i.e., the table recognition processing performed with the table recognition application 122) to the external terminal 50.

Thereafter, the variable j is determined not to have attained the value N in step S56, and the processing in step S57 is performed again (i.e., the variable j is updated with the value "3"), and then step S21 is performed again.

Further, the application having the third preferential rank (two-dimensional barcode analysis application) 123 (j=3) will be explained. When the divided image data 262 having the two-dimensional barcode attribute are already received and stored in the storage unit 55, this application 123 determines that the required image data for the application 123 have already been stored in step S52.

At this point in time (at the point in time substantially immediately after the execution instruction of the processing performed with the table recognition application 122), all the data transmitted from the MFP 10 are already received by the external terminal 50 (see FIG. 10), and therefore, the processing in steps S21, S23 are performed, and then step S52 is performed.

Then, the required image data of the two-dimensional barcode analysis application 123 (divided image data 262) are determined to have been stored in step S52, and the processing in step S53 is subsequently performed.

In step S53, the application 123 of the third rank is determined not to be the page unit processing application, and the processing in step S55 is subsequently performed.

Then, in step S55, the execution instruction of the processing performed with the application 123 of the third rank and the divided image data 262 determined to be the processing target data of the application 123 of the third rank are transmitted from the external terminal 50 to the cloud server 90 (see FIG. 10).

When the cloud server 90 receives the execution instruction and the divided image data 262 from the external terminal 50, the two-dimensional barcode analysis application 123 executes the two-dimensional barcode analysis processing on the divided image data 262 (also see FIG. 10). When the two-dimensional barcode analysis processing is completed, the cloud server 90 transmits the processing result (two-dimensional barcode information (link destination URL and the like)) of the application 123 (i.e., the two-dimensional barcode analysis processing performed with the two-dimensional barcode analysis application 123) to the external terminal 50.

Then, the variable j is determined to have attained the value "3" in step S56, and the processing in step S27 of FIG. 13 is subsequently performed.

As described above, the external terminal 50 transmits the divided image data determined to be the processing target data of the application in question to the cloud server 90 for each of the applications in question 121 to 123 which are set in the same order as the processing order of the applications 121 to 123 by the MFP 10 (determination unit 14). Then, the external terminal 50 causes the cloud server 90 to execute the related processing in question with the applications in question 121 to 123.

In step S27, a determination is made as to whether all the divided image data have been received from the MFP 10 or not. In this case, the reception of all the divided image data 261 to 264 from the MFP 10 has already been completed, and therefore, the processing in step S28 is subsequently performed.

Then, the generation unit 64 integrates all the divided image data 261 to 264 to generate the integrated image data 402 corresponding to step S202 (step S28) (also see FIG. 10).

In step S58, a determination is made as to whether the processing results of all the applications (121 to 123) have been received from the cloud server 90 or not. More specifically, the text data are received from the cloud server 90 as the processing result of the OCR application 121, and not only the text data but also the character position information are received. The table data are received from the cloud server 90 as the processing result of the table recognition application 122, and not only the table data but also the table position information are received. Further, the two-dimensional barcode information (link destination URL and the like) are received from the cloud server 90 as the processing result of the two-dimensional barcode analysis application 123.

When the processing results of all the applications (121 to 123) are determined to have been received from the cloud server 90 (step S56), the generation unit 64 generates the electronic document 502 on the basis of the integrated image data 402 and each processing result (step S30) (also see FIG. 10). More specifically, the electronic document 502 having the processing results based on the OCR processing, the table recognition processing, and the two-dimensional barcode analysis processing (text data, table data, link destination URL, and the like) embedded therein is generated.

As described above, in the operation according to the second embodiment, the MFP 10 determines whether each of the divided image data 261 to 264 is the processing target data of the application in question or not with regard to the application in question of the applications 121 to 123 which are set in order in accordance with the descending order of the required processing time thereof. Then, the divided image data determined to be the processing target data of the application in question are transmitted at an earlier point in time (in a preferential manner) from the MFP 10 to the external terminal 50. Then, the external terminal 50 transmits the execution instruction of the processing performed with the application in question and the processing target data (divided image data) to the cloud server 90 in accordance with the descending order of the required processing time. Therefore, the external terminal 50 can start, at an earlier point in time, execution of an application of multiple applications of which required processing time is relatively longer, and therefore, the electronic document 502 can be generated in a more efficient manner.

Modified Example According to Second Embodiment

For example, the second embodiment shows a case where the external terminal 50 causes the cloud server 90 to execute the related processing performed with multiple applications in the same order as the processing order of multiple applications with the MFP 10 (the transmission processing order from the MFP 10 to the external terminal 50), but the embodiment is not limited thereto. More specifically, when it is determined that there is an application of multiple applications that has already completed reception of image data required for starting executing of the processing (such as divided image data) from the MFP 10, the external terminal 50 may cause the cloud server 90 to execute the application regardless of the processing order. In other words, when it is determined that multiple pieces of related processing performed with the cloud server 90 involves particular related processing that has completed reception of image data required for starting execution of the processing from the MFP 10, the particular related processing may be caused to be executed by the cloud server 90. More specifically, the divided image data determined to be the processing target data of the particular related processing may be transmitted to the cloud server 90 regardless of the processing order (preferential rank) about the multiple pieces of related processing, and the particular related processing may be caused to be executed by the cloud server 90.

FIG. 14 is a figure illustrating overview of operation of an electronic document generation system 1 according to such a modified example. FIG. 15 is a flowchart illustrating operation of the external terminal 50 according to this modified example. A step subsequent to step S63 of FIG. 15 is step S27 of FIG. 13.

The processing in steps S21 to S24 of FIG. 15 has the same contents as the processing in steps S21 to S24 of FIG. 12.

In step S61, a determination is made as whether applications for which execution instructions have not yet been transmitted include an application for which required image data have already been stored (which may also be referred to as a required image data-stored application, execution preparation completion application, and the like). In other words, a determination is made as whether related processing for which execution instructions have not yet been transmitted include related processing for which required image data have already been stored (which may also be referred to as required image data-stored related processing, execution preparation completion related processing, or the like).

When it is determined that there is no required image data-stored application, the processing in step S21 is performed again. When it is determined that there is required image data-stored application, a determination is made as to whether the required image data-stored application is a page unit processing application or not in step S62.

When the required image data-stored application is determined to be a page unit processing application in step S62, the processing in step S63 is subsequently performed. When the required image data-stored application is determined not to be a page unit processing application in step S62, the processing in step S64 is subsequently performed.

Then, in step S65, a determination is made as to whether there is any application for which the execution instruction has not yet been transmitted (i.e., whether there is any related processing for which the execution instruction has not yet been transmitted). When it is determined that there is an application for which the execution instruction has not yet been transmitted, the processing in step S21 is subsequently performed. When it is determined that there is no application for which the execution instruction has not yet been transmitted (the execution instructions of the processing performed with all the applications have been transmitted to the cloud server 90), the processing in step S27 of FIG. 13 is subsequently performed.

Hereinafter, operation with the external terminal 50 according to this modified example, i.e., reception operation of various kinds of data from the MFP 10 and operation performed after that will be explained in a more specific manner. It should be noted that the MFP 10 performs the same operation as the operation of FIG. 11. More specifically, the MFP 10 transmits the divided image data 261, the generation instruction of the dummy divided data 362, the divided image data 263, the divided image data 264, the divided image data 262, the generation instruction of the dummy divided data 363, and then the generation instruction of the dummy divided data 364 to the external terminal 50 in this order (transmission order) (see FIG. 14). The external terminal 50 receives various kinds of data in accordance with the transmission order.

First, the external terminal 50 receives the divided image data 261 from the MFP 10 (step S21) (also see FIG. 14), the external terminal 50 temporarily stores the divided image data 261 to the storage unit 55 (step S22). At this point in time, it is determined that there is no required image data-stored application in step S61, and the processing in step S21 is performed again.

Subsequently, when the external terminal 50 receives the generation instruction of the dummy divided data 362 (step S23) (also see FIG. 14), the dummy divided data 362 are generated by the generation unit 64, and temporarily stored to the storage unit 55 (step S24). At this point in time, it is also determined that the required image data-stored application does not exist in step S61, and the processing in step S21 is performed again.

When the divided image data 263, 264 are respectively received (step S21) (also see FIG. 14), the divided image data 263, 264 are respectively temporarily stored to the storage unit 55 (step S22).

When the divided image data 264 are stored, the storage unit 55 has already stored the divided image data 261, 263, 264 and the dummy divided data 362. In other words, the required image data for the OCR processing (all the image data required to start execution) have already been stored.

At this occasion, the OCR application 121 is determined to be the required image data-stored application, and it is determined that there is an application for which required image data have been stored (execution preparation completion application) in step S61. Thereafter, the processing in step S62 is subsequently performed.

In step S62, the OCR application 121 (required image data-stored application) is determined to be the page unit processing application, and the processing in step S63 is subsequently performed.

Then, in step S63, the divided image data 261, 263, 264 and the dummy divided data 362 are combined to generate the combined data 311, and the execution instruction of the processing performed with the OCR application 121 and the combined data 311 are transmitted from the external terminal 50 to the cloud server 90 (see FIG. 14).

At this point in time, the execution instruction of the processing performed with the applications 122, 123 has not yet been transmitted to the cloud server 90. For this reason, it is determined that there is an application for which the execution instruction has not yet been transmitted in step S65, and the processing in step S21 is performed again.

Subsequently, when the external terminal 50 receives the divided image data (FIG. 9) 262 having the two-dimensional barcode attribute and the table attribute from the MFP 10 (step S21) (also see FIG. 14), the divided image data 262 are temporarily stored to the storage unit 55 (step S22).

In this case, the two-dimensional barcode analysis application 123 is not the page unit processing application, and therefore, when the divided image data 262 are received and stored, the required image data for the two-dimensional barcode analysis application 123 are determined to have already been stored in step S61. More specifically, the two-dimensional barcode analysis application 123 is determined to be the required image data-stored application, and it is determined that the required image data-stored application exists. Thereafter, the processing in step S62 is subsequently performed.

In step S62, the two-dimensional barcode analysis application 123 (the required image data-stored application) is determined not to be the page unit processing application, and the processing in step S64 is subsequently performed.

Then, in step S64, the external terminal 50 transmits the execution instruction of the processing performed with the two-dimensional barcode analysis application 123 and the divided image data 262 determined to be the processing target data of the two-dimensional barcode analysis application 123 to the cloud server 90 (also see FIG. 14).

As described above, when, among multiple applications 121 to 123, the application 123 is determined to exist that has completed reception of the divided image data 262 required to start the execution of the processing, the execution instruction of the processing performed with the application 123 and the divided image data 262 are transmitted to the cloud server 90 regardless of the processing order of multiple applications in the MFP 10. In other words, when multiple pieces of related processing is determined to include particular related processing that has completed reception of the image data required to start the execution of the processing from the MFP 10, the execution instruction of the particular related processing (the two-dimensional barcode analysis processing) and the image data required to start the execution of the processing are transmitted to the cloud server 90 regardless of the processing order (preferential rank) of multiple pieces of related processing. More specifically, even when the preferential rank of the "two-dimensional barcode analysis processing" (the application 123) (the third rank) is lower than the preferential rank of the "table recognition processing" (the application 122) (the second rank), the two-dimensional barcode analysis processing for which execution preparation has been completed is started at a point of time earlier than the table recognition processing for which execution preparation has not yet been completed.

At this point in time, the execution instruction of the processing performed with the application 122 has not yet been transmitted to the cloud server 90. Therefore, it is determined that there is an application for which execution instruction has not yet been transmitted in step S65, and the processing in step S21 is performed again.

Further, the external terminal 50 respectively receives the generation instructions of the dummy divided data 363, 364 (step S23) (also see FIG. 14). When the external terminal 50 receives each of the generation instructions, the dummy divided data 363, 364 are respectively generated, and temporarily stored to the storage unit 55 (step S24).

Therefore, the storage unit 55 has already stored the divided image data 261, the divided image data 262, the dummy divided data 363, and the dummy divided data 364 (more specifically, the divided image data 263, 264 and the dummy divided data 362 are also have already been stored). In other words, the required image data of the table recognition application 122 have already been stored.

Accordingly, the table recognition application 122 is determined to be the required image data-stored application, and it is determined that the required image data-stored application (the execution preparation completion application) exists in step S61. Thereafter, the processing in step S62 is subsequently performed.

In step S62, the table recognition application 122 (the required image data-stored application) is determined to be the page unit processing application, and the processing in step S63 is subsequently performed.

In step S63, the divided image data 261, the divided image data 262, the dummy divided data 363, and the dummy divided data 364 are combined to generate the combined data 312, and the execution instruction of the processing performed with the table recognition application 122 and the combined data 312 are transmitted from the external terminal 50 to the cloud server 90 (see FIG. 14).

Then, it is determined that there is no application for which the execution instruction has not yet been transmitted (the execution instructions of the processing performed with all the applications 121 to 123 have been transmitted to the cloud server 90) in step S65, and the processing in step S27 of FIG. 13 is subsequently performed.

Accordingly, when the required image data-stored application (the application that has received the image data required to start the execution of the processing) (123) exists, the external terminal 50 transmits the image data and the execution instruction of the processing performed with the application 123 to the cloud server 90 regardless of the processing order of multiple applications in the MFP 10. Therefore, regardless of the required processing time of each application, the external terminal 50 can start the execution of the application that can start the execution of the processing at an earlier point in time, and therefore, the external terminal 50 can generate the electronic document 502 in a more efficient manner.

3. Modification and the Like

The embodiment of the invention has been hereinabove explained, but the invention is not limited to the above contents.

For example, each of the above embodiments shows a case where the cloud server 90 executes various kinds of processing (various kinds of applications), but the embodiments are not limited thereto. Alternatively, the external terminal 50 may execute various kinds of related processing (the OCR processing, the table recognition processing, and the like). More specifically, the external terminal 50 may execute not only the generation processing of the electronic document but also the related processing related to the generation processing (the OCR processing, the table recognition processing, and the like), and generate the electronic document on the basis of the processing results of the related processing (the text data, the table data, and the like) and the integrated image data.

Each of the above embodiments showed a case where, for example, the external terminal 50 transmits the execution instruction of the processing performed with the application and the image data (the combined data, the divided image data, and the like) to the cloud server 90 at a time, but the embodiments are not limited thereto. Alternatively, the external terminal 50 may separately transmit the execution instruction and the image data to the cloud server 90. For example, the external terminal 50 may transmit the execution instruction of the processing performed with the application to the cloud server 90 in advance, and thereafter, transmit the image data to the cloud server 90. Then, when the cloud server 90 receives the image data, the cloud server 90 may execute the processing performed with the application on the basis of the execution instruction that has been received.

Each of the above embodiments showed a case where, for example, the scanned images (201, 202) are divided in units of belt-shaped areas (constituted by a predetermined number of horizontal lines), but the embodiments are not limited thereto. Alternatively, the scanned image may be divided in units of tile-shaped areas (areas where a belt-shaped area is divided with a predetermined number of horizontal lines).

Each of the above embodiments showed a case where, for example, the dummy divided data are generated by the external terminal 50, but the embodiments are not limited thereto. Alternatively, the dummy divided data may be generated by the MFP 10.

For example, when the MFP 10 generates the dummy divided data, the MFP 10 may generate dummy divided data corresponding to the divided image data determined not to be the processing target of the application, and transmit the dummy divided data to the external terminal 50.

Each of the above embodiments showed a case where, for example, the electronic document in the PDF format is generated, but the embodiments are not limited thereto. More specifically, electronic documents in various kinds of file formats (TIFF (Tagged Image File Format) format, JPEG (Joint Photographic Experts Group) format, HTML (HyperText Markup Language) format, XML (Extensible Markup Language) format (including OOXML (Office Open XML) format and the like), EPUB (Electronic PUBlication) format, Word format, Excel (registered trademark) format, PowerPoint (registered trademark) format and the like) may be generated.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An electronic document generation system comprising:
an image forming apparatus configured to generate a scanned image of an original document; and
an external terminal configured to receive image data of the scanned image from the image forming apparatus, and generate an electronic document based on the scanned image,
wherein the image forming apparatus includes:
a divided data generation unit configured to divide the scanned image into a plurality of areas and generate a plurality of divided image data;
a determination unit configured to determine whether each of the plurality of divided image data is processing target data of related processing related to generation of the electronic document; and
a communication unit configured to transit the plurality of divided image data to the external terminal,
of the plurality of divided image data, the communication unit transmits, to the external terminal, divided image data that is determined to be the processing target data at an earlier point in time, and transmits, to the external terminal, divided image data that is determined not to be the processing target data after the divided image data that is determined to be the processing target data are transmitted, and
the external terminal includes:
an obtaining unit configured to obtain a processing result of the related processing of preferential data which are divided image data of the plurality of divided image data determined to be the processing target data and transmitted at an earlier point in time from the image forming apparatus; and
a document generation unit configured to generate the electronic document on the basis of the processing result and the plurality of divided image data.

2. The electronic document generation system according to claim 1, wherein the external terminal further includes:
- a transmission unit configured to transmit, to a cloud server, the preferential data which are divided image data of the plurality of divided image data that are transmitted from the image forming apparatus at an earlier point in time, before reception of the plurality of divided image data is completed; and
- a reception unit configured to receive, from the cloud server, a processing result of the related processing of the preferential data executed by the cloud server.

3. The electronic document generation system according to claim 2, wherein the communication unit of the image forming apparatus also transmits, to the external terminal, a generation instruction indicating generation of dummy divided data which are dummy image data corresponding to non-preferential data, before the non-preferential data which are divided image data of the plurality of divided image data determined not to be the processing target data are transmitted,

- when the generation instruction is received, the document generation unit of the external terminal generates the dummy divided data, and combines the dummy divided data and the preferential data to generate combined data,
- an image based on the dummy divided data is disposed at a position of an image based on the combined data corresponding to a display position of the non-preferential data of the scanned image, and
- the transmission unit of the external terminal transmits the combined data to the cloud server before the reception of the plurality of divided image data is completed.

4. The electronic document generation system according to claim 2, wherein the document generation unit of the external terminal generates combined data by combining the plurality of preferential data of the plurality of divided image data transmitted from the image forming apparatus at an earlier point in time,
- the transmission unit of the external terminal transmits the combined data to the cloud server before the reception of the plurality of divided image data is completed.

5. The electronic document generation system according to claim 1, wherein the determination unit of the image forming apparatus determines that divided image data having a particular attribute corresponding to the related processing are the processing target data.

6. The electronic document generation system according to claim 1, wherein when optical character recognition processing is executed as the related processing, the determination unit of the image forming apparatus determines that divided image data including a character are the processing target data, and
- the document generation unit of the external terminal generates the electronic document on the basis of the plurality of divided image data and text data which is a processing result of the optical character recognition processing.

7. The electronic document generation system according to claim 1, wherein the document generation unit of the external terminal executes, in parallel with the related processing, generation processing of integrated image data which are image data obtained by integrating the plurality of divided image data and are image data corresponding to the scanned image, and
- the electronic document is generated on the basis of the integrated image data and a processing result of the related processing.

8. The electronic document generation system according to claim 1, wherein the determination unit of the image forming apparatus sets a preferential order of the plurality of pieces of related processing into a descending order of a required processing time of each of the plurality of pieces of related processing, and determines whether each of the plurality of divided image data is processing target data of the related processing in question of the plurality of pieces of related processing which is set in order in accordance with preferential order, and
- the communication unit of the image forming apparatus transmits, to the external terminal, divided image data determined to be processing target data of the related processing in question at a point in time earlier than a point in time when divided image data determined not to be processing target data of the related processing in question are transmitted.

9. The electronic document generation system according to claim 2, wherein the determination unit of the image forming apparatus sets a preferential order of the plurality of pieces of related processing into a descending order of a required processing time of each of the plurality of pieces of related processing, and determines whether each of the plurality of divided image data is processing target data of the related processing in question of the plurality of pieces of related processing which is set in order in accordance with preferential order,
- the communication unit of the image forming apparatus transmits, to the external terminal, divided image data determined to be processing target data of the related processing in question at a point in time earlier than a point in time when divided image data determined not to be processing target data of the related processing in question are transmitted, and
- the transmission unit of the external terminal transmits, to the cloud server, divided image data determined to be processing target data of each piece of related processing in question of the plurality of pieces of related processing which is set in the same order as the preferential order that is set by the image forming apparatus, and causes the cloud server to execute each piece of related processing in question.

10. The electronic document generation system according to claim 2, wherein the determination unit of the image forming apparatus sets a preferential order of the plurality of pieces of related processing into a descending order of a required processing time of each of the plurality of pieces of related processing, and determines whether each of the plurality of divided image data is processing target data of the related processing in question of the plurality of pieces of related processing which is set in order in accordance with preferential order,
- the communication unit of the image forming apparatus transmits, to the external terminal, divided image data determined to be processing target data of the related processing in question at a point in time earlier than a point in time when divided image data determined not to be processing target data of the related processing in question are transmitted, and
- when it is determined that the plurality of pieces of related processing includes particular related processing which has completed reception of image data required to start execution of the processing from the image forming apparatus, the transmission unit of the external terminal transmits, to the cloud server, divided image data determined to be processing target data of the particular related processing regardless of the preferential order of the plurality of pieces of related processing, and causes the cloud server to execute the particular related processing.

11. An image forming apparatus capable of communicating with an external terminal generating an electronic document, comprising:
    a divided data generation unit configured to generate a plurality of divided image data by dividing a scanned image of an original document into a plurality of areas;
    a determination unit configured to determine whether each of the plurality of divided image data is processing target data of related processing executed in relation with generation of the electronic document; and
    a communication unit configured to transmit the plurality of divided image data to the external terminal,
    wherein the communication unit transmits, to the external terminal, divided image data of the plurality of divided image data determined to be the processing target data at an earlier point in time, and transmits, to the external terminal, divided image data of the plurality of divided image data determined not to be the processing target data at a point in time after the divided image data determined to be the processing target data are transmitted.

12. The image forming apparatus according to claim 11, wherein the related processing is processing executed by the external terminal.

13. The image forming apparatus according to claim 11, wherein the related processing is processing that is executed by a cloud server capable of communicating with the external terminal.

14. A non-transitory recording medium storing a computer readable program for causing a computer which controls an image forming apparatus capable of communicating with an external terminal generating an electronic document to execute:
    a) a step of generating a plurality of divided image data by dividing a scanned image of an original document into a plurality of areas;
    b) a step of determining whether each of the plurality of divided image data is processing target data of related processing executed in relation with generation of the electronic document; and
    c) a step of transmitting the plurality of divided image data to the external terminal,
    wherein in the step c), divided image data of the plurality of divided image data determined to be the processing target data is transmitted to the external terminal at an earlier point in time, and divided image data of the plurality of divided image data determined not to be the processing target data is transmitted to the external terminal at a point in time after the divided image data determined to be the processing target data are transmitted.

15. A non-transitory recording medium storing a computer readable program for causing a computer which controls an external terminal capable of communicating with an image forming apparatus to execute generation processing of an electronic document,
    the program causing the computer to execute:
    a) a step of receiving, from the image forming apparatus at an earlier point in time, divided image data, of the plurality of divided image data generated by dividing a scanned image of an original document into a plurality of areas, that is determined to be processing target data of related processing related to generation processing of the electronic document;
    b) a step of obtaining a processing result of the related processing of preferential data of the plurality of divided image data which are divided image data determined to be the processing target data and transmitted from the image forming apparatus at an earlier point in time; and
    c) a step of generating the electronic document on the basis of the processing result and the plurality of divided image data.

16. The non-transitory recording medium storing a computer readable program according to claim 15 causing the computer to further execute:
    d) a step of, before step b), transmitting, to a cloud server, the preferential data, which are divided image data of the plurality of divided image data determined to be the processing target data and transmitted from the image forming apparatus at an earlier point in time before reception of the plurality of divided image data is completed; and
    e) a step of receiving a processing result of the related processing of the preferential data executed by the cloud server from the cloud server.

17. The non-transitory recording medium storing a computer readable program according to claim 16 causing the computer to further execute:
    f) a step of, before step d), generating dummy divided data when receiving, from the image forming apparatus, a generation instruction for generating the dummy divided data which are dummy image data corresponding to non-preferential data which are divided image data of the plurality of divided image data determined not to be the processing target data; and
    g) a step of generating the dummy divided data in response to reception of the generation instruction, and generating combined data by combining the dummy divided data and the preferential data,
    wherein an image based on the dummy divided data is disposed at a position of an image based on the combined data corresponding to a display positon of the non-preferential data in the scanned image,
    in step d), the combined data are transmitted to the cloud server before reception of the plurality of divided image data is completed.

18. The non-transitory recording medium storing a computer readable program according to claim 16 causing the computer to further execute:
    h) a step of, before step d), generating combined data by combining a plurality of preferential data of the plurality of divided image data transmitted from the image forming apparatus at an earlier point in time,
    wherein, in step d), the combined data are transmitted to the cloud server before reception of the plurality of divided image data is completed.

19. The electronic document generation system according to claim 1, wherein the external terminal further includes an execution start unit configured to start execution of the related processing performed with the external terminal on the preferential data of the plurality of divided image data transmitted from the image forming apparatus at an earlier point in time before reception of the plurality of divided image data is completed.

20. The non-transitory recording medium storing a computer readable program according to claim 15 causing the computer to further execute:

i) a step of, before step b), starting execution of the related processing performed with the external terminal on the preferential data of the plurality of divided image data transmitted from the image forming apparatus at an earlier point in time before reception of the plurality of divided image data is completed.

* * * * *